United States Patent [19]

Shiba

[11] Patent Number: 5,148,198
[45] Date of Patent: Sep. 15, 1992

[54] LENS-FITTED PHOTOGRAPHIC FILM UNIT, A PROCESSOR FOR PROCESSING THE SAME, AND A PROCESSING SYSTEM THEREFOR

[75] Inventor: Keisuke Shiba, Kanagawa, Japan

[73] Assignee: Fuji Photo Film Co., Ltd., Kanagawa, Japan

[21] Appl. No.: 710,225

[22] Filed: Jun. 4, 1991

[30] Foreign Application Priority Data

Jun. 4, 1990 [JP] Japan .................................. 2-146021

[51] Int. Cl.⁵ ................................................ G03B 3/08
[52] U.S. Cl. ................................................ 354/319
[58] Field of Search ................ 354/319, 320, 321, 322

[56] References Cited

U.S. PATENT DOCUMENTS 4,731,628 3/1988 Uenaka et al. ....................... 354/319
4,797,698 1/1989 Uenaka et al. ....................... 354/319

FOREIGN PATENT DOCUMENTS 60-191257 9/1985 Japan .

Primary Examiner—Michael L. Gellner
Assistant Examiner—David M. Gray
Attorney, Agent, or Firm—Sughrue, Mion, Zinn, Macpeak & Seas

[57] ABSTRACT

A lens-fitted photographic film unit provided with a shutter, a taking lens and a film wind-up mechanism has a film unit housing, an exposure station, a film supplying chamber and a film take-up chamber, which is provided with a spool for tightly winding exposed film. A film outlet is provided with the film take-up chamber to let out a film leader to the outside when rotating the spool in the unwinding direction. Light trapping fabric is attached in the film outlet to trap external light. In a preferred embodiment, the friction coefficient of a back surface is 0.35 or less with respect to an emulsion surface, whereas the dynamic friction coefficient is 0.36 or less with respect to a steel ball. A film processor for developing the film in the film unit is provided with a holder for loading film units. A spool rotating mechanism rotates the spool to automatically let out the film. Roller pairs are provided to feed the film through the film outlet toward a processor unit, which serves to process the exposed film.

12 Claims, 14 Drawing Sheets

FIG. 14
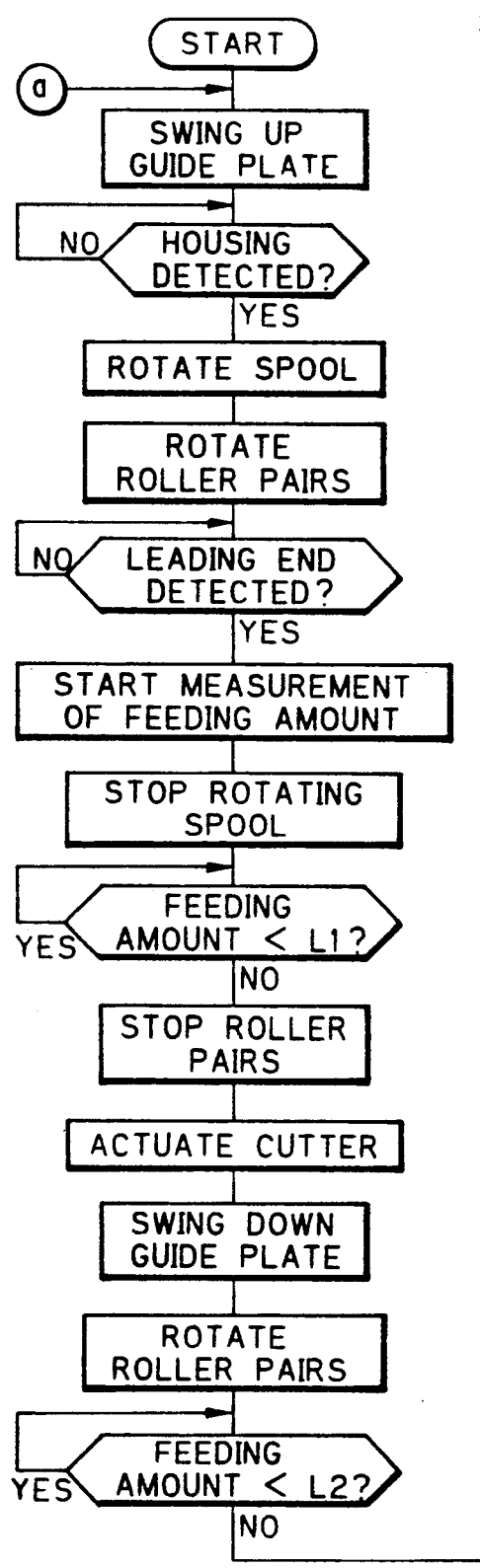
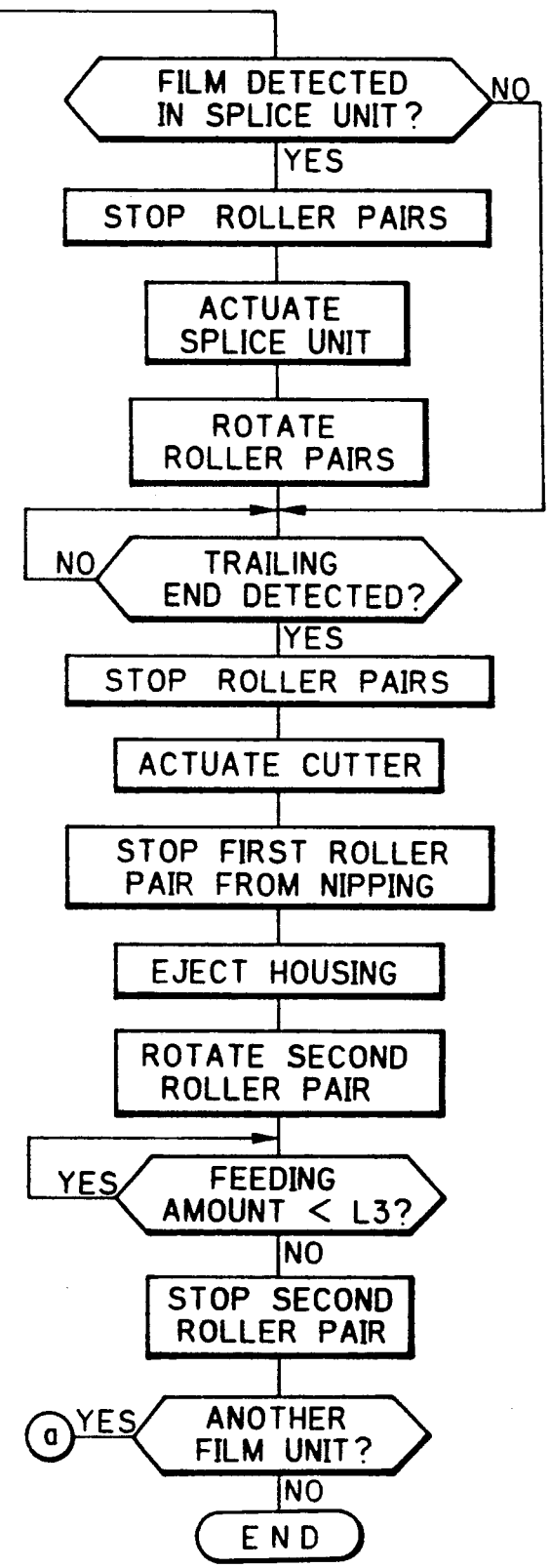

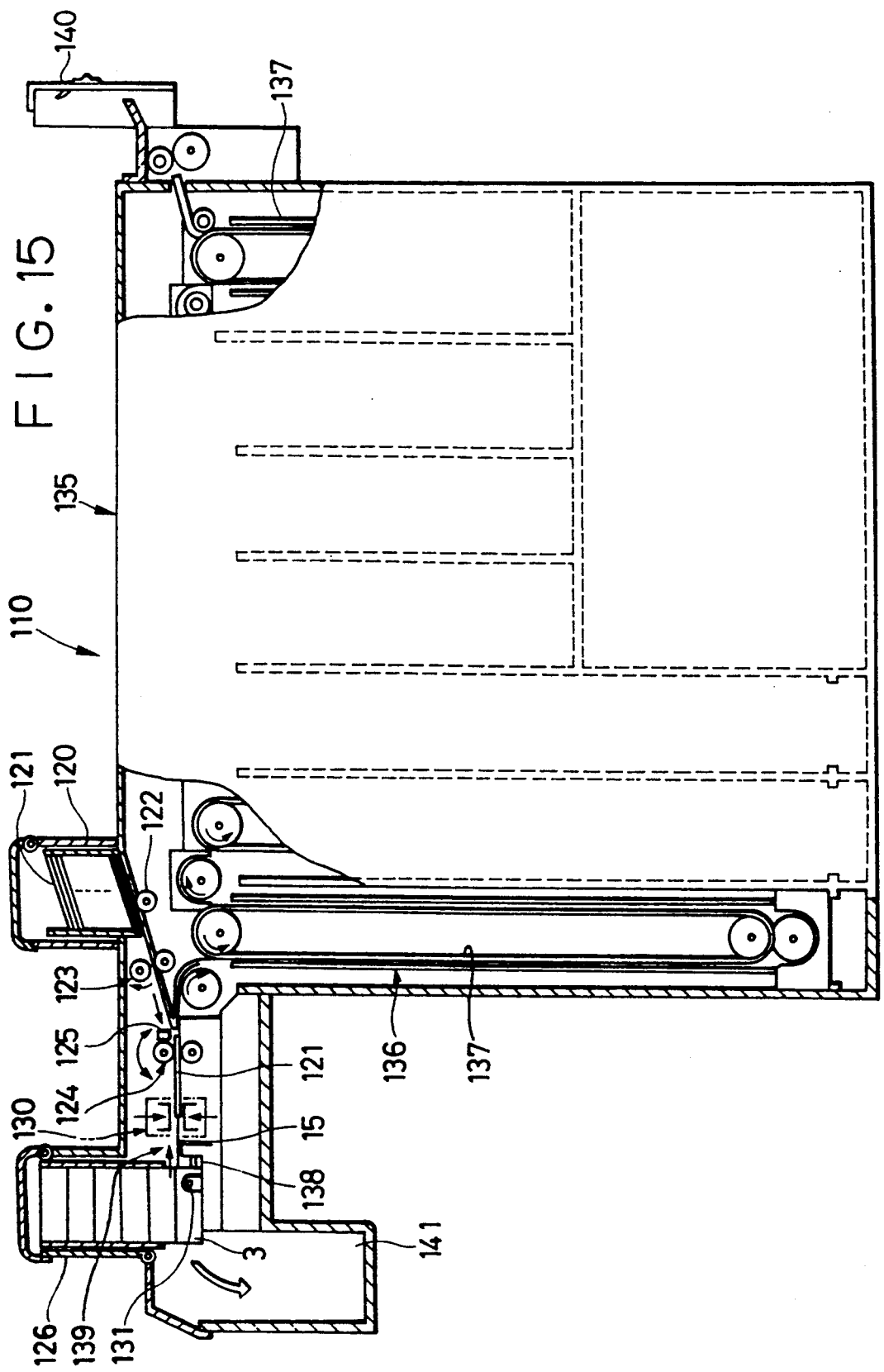

LENS-FITTED PHOTOGRAPHIC FILM UNIT, A PROCESSOR FOR PROCESSING THE SAME, AND A PROCESSING SYSTEM THEREFOR

BACKGROUND OF THE INVENTION

1. Field of the Invention

The present invention relates to a photographic film unit having an exposure function, a film processing system and a processor for processing the same, more particularly to a film unit of which exposed photographic film contained therein can be taken directly out of a film unit housing.

2. Description Relative to the Background Art

A lens-fitted photographic film unit is sold at a low cost, comparable to a conventional film, and is available wherever ordinary photographic films are sold. It is easy to get a new lens-fitted photographic film unit and to take photographs without a camera, if one who takes no camera along but wants to take photographs. There are two types of lens-fitted film units, in one of which a 135-type film cassette is preloaded in a film unit housing, and in another of which a 110-type film cassette is preloaded in a film unit housing.

After the exposure of all of the frames of the film, the lens-fitted film unit is forwarded to a photolaboratory in its entirety, from which the cassette of 135-type or 110-type containing the exposed film in a roll is unloaded by disassembling or breaking a film unit housing with a jig for processing the film. As is well-known in the art, the unloaded cassette is broken or set in a leader advancing device which draws out the film leader, thereby to take out the film for processing.

However, there is a problem in low efficiency in the processes of processing the film in the lens-fitted film unit, because the film is taken out by disassembling or breaking the film unit housing and the cassette. A film cassette is disclosed in U.S. Pat. No. 4,423,943 in which the film after exposure is wound in the cassette body up to the leading end portion for storing the film, and is let out of the cassette body for development by rotating the spool in the direction reverse to the direction of winding up the film. Variant constructions of a film cassette for the similar purpose are disclosed in Japanese Utility Model Publication No. 41-6297, and Japanese Patent Publications Nos. 43-3416 and 55-21089. However, it is necessary in a lens-fitted film unit containing a film cassette therein to take the film cassette out of the film unit for taking out the film, so that even the above improvement of the film cassette cannot reduce the labor required for taking the film cassette out of film unit.

SUMMARY OF THE INVENTION

It is therefore an object of the present invention to provide a photographic film unit from which exposed film can be taken out easily without extra skill for subjecting it to development, a film processor and a processing for developing the same.

It is another object of the present invention to provide a photographic film unit from which the film can be taken out without scratching the film.

It is still another object of the present invention to provide a photographic film unit, a processor and a processing system from which the film can be taken out without disassembling or breaking a film unit housing for partial reuse of the film unit housing.

In order to achieve the above and other objects and advantages of this invention, a photographic film unit comprises: an exposure station for exposing the unexposed film; a film supplying chamber disposed beside the exposure station for containing the unexposed film wound in a roll with a film leader wound internally; a film take-up chamber disposed on a side opposite to the film supplying chamber with respect of the exposure station, in which a spool is contained rotatably, on which spool the film subjected to exposure is wound after passage through an entrance is of the film take-up chamber when the spool is rotated in a first direction; a film outlet formed on the film take-up chamber for passing the film leader toward an outside of the film unit when the spool is rotated in a second direction opposite to the first direction after winding the film leader in the film take-up chamber; and a light shielding member provided with the film outlet for shielding an inside of the film take-up chamber from light.

A processor for subjecting the film unit to processing includes film unit holding means for being loaded with the film unit; a processor unit for processing the exposed film; control means for controlling the processor unit; spool rotating means for rotating the spool in the film unit loaded in the film unit holding means in the second direction in accordance with an output from the control means; and film transporting means for transporting the film leader to the processor unit in accordance with an output from the control means, the film leader being let out of the film outlet. The exposed film can be let out by rotating the spool, so that the film unit needs no disassembly for processing.

BRIEF DESCRIPTION OF THE DRAWINGS

The above objects and advantages of the present invention will become more apparent from the following detailed description when read in connection with the accompanying drawings, in which:

FIG. 14 is a flowchart illustrating a controlling procedure in the processor illustrated in FIG. 12;

FIG. 15 is a schematic diagram illustrating a processor in accordance with another preferred embodiment.

DETAILED DESCRIPTION OF THE PREFERRED EMBODIMENTS OF THE PRESENT INVENTION

1. Description of a Lens-Fitted Photographic Film Unit

Figure 1:
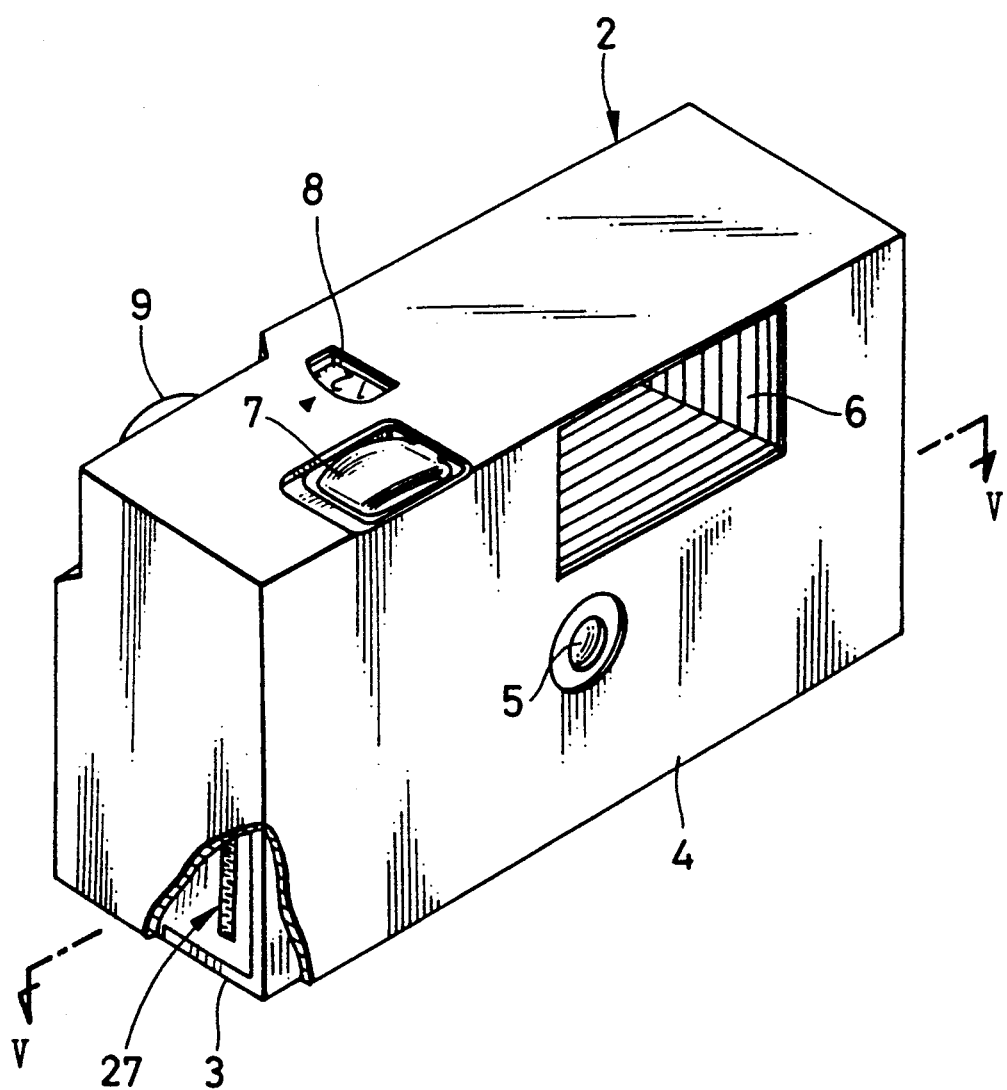
FIG. 1 is a perspective view illustrating the exterior appearance of a lens-fitted photographic film unit in accordance with the present invention.

Referring now to FIG. 1, illustrated therein is a lens-fitted photographic film unit 2 (which is herein referred to as a film unit for simplicity) of the present invention which comprises a rectangular box-shaped film unit housing 3 and an external casing 4, made of a printable cardboard, a printable thin plastics sheet or the like, in which the film unit housing 3 is tightly encased. The film unit housing 3 is provided with a taking lens 5, a finder window 6, a shutter release member 7, a frame counter 8 and a film advancing knob 9 all of which are positioned in openings formed at predetermined portions of the external casing 4.

Figure 2:
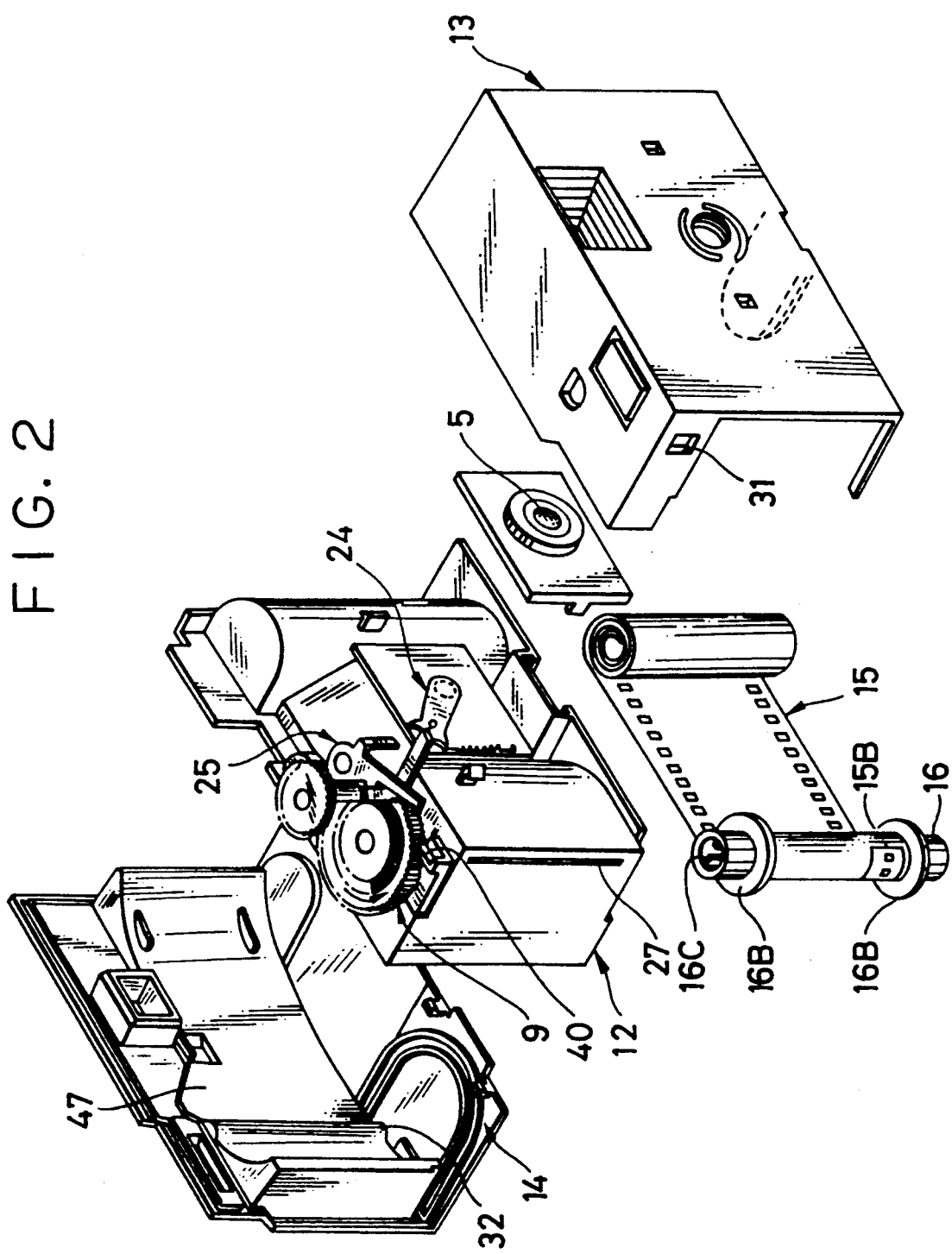
FIG. 2 is an exploded perspective view illustrating the film unit illustrated in FIG. 1.

In FIG. 2 illustrating the film unit housing 3, the film unit housing 3 is constituted by a main body 12, a front cover 13, a rear cover 14, photographic film 15, e.g., negative film, and a spool 16 on which the film 15 is wound.

Figure 3:
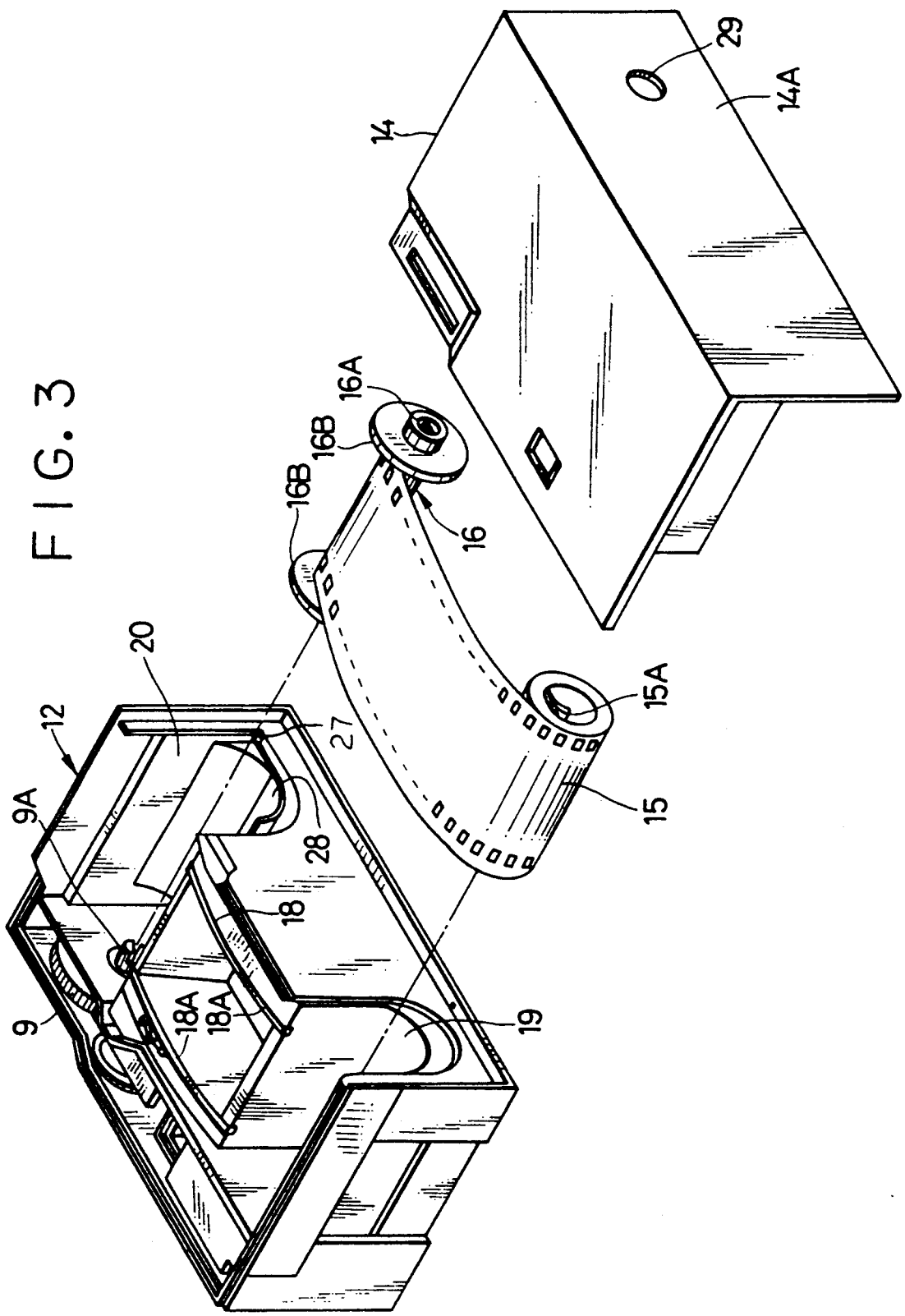
FIG. 3 is an exploded perspective view illustrating the film unit illustrated in FIG. 1 observed from behind.

In FIG. 3, the main body 12 is provided with a film supplying chamber 19 and a film take-up chamber 20 on the rear side. The film supplying chamber 19 is previously loaded with the film 15 wound in a roll with a leading end portion 15A of the film 15 wound inside. It is noted that a rotary spool may be also provided in the film supplying chamber 19 for winding the film 15 in a roll thereon. The spool 16 is disposed in the film take-up chamber 20, to which spool a trailing end portion 15B of the film 15 is attached by an adhesive tape. The film advancing knob 9 is rotatably mounted on the upper side of the film take-up chamber 20. Specifically, a fork 9A formed on the film advancing knob 9 projects into the inside of the film take-up chamber 20, and engages with an upper end of the spool 16 An operation of rotating the film advancing knob 9 causes the spool 16 to rotate to wind the film 15.

The taking lens 5, simply constructed, and a shutter mechanism 24 are disposed on the front side of the main body 12 as in FIG. 3 in a manner of a lens-fitted photographic film package as is already known in the art. A film wind-up device 25 is mounted in the main body 12 by linking with the film advancing knob 9 for advancing the film 15 frame by frame. The detailed description regarding the lens 5 and the shutter mechanism 24 are set forth in Japanese Patent Laid-open Publication No. 64-544 and Japanese Utility Model Examined Publication No. 1-39579.

Figure 4:
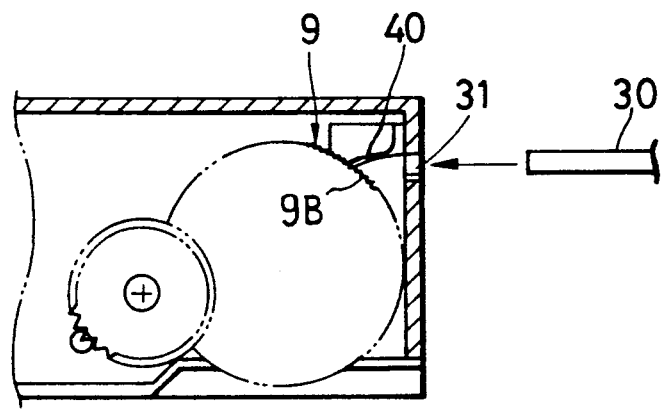
FIG. 4 is a section view illustrating an operation of releasing a rewind preventing mechanism of the film unit illustrated in FIG. 1.
Figure 5:
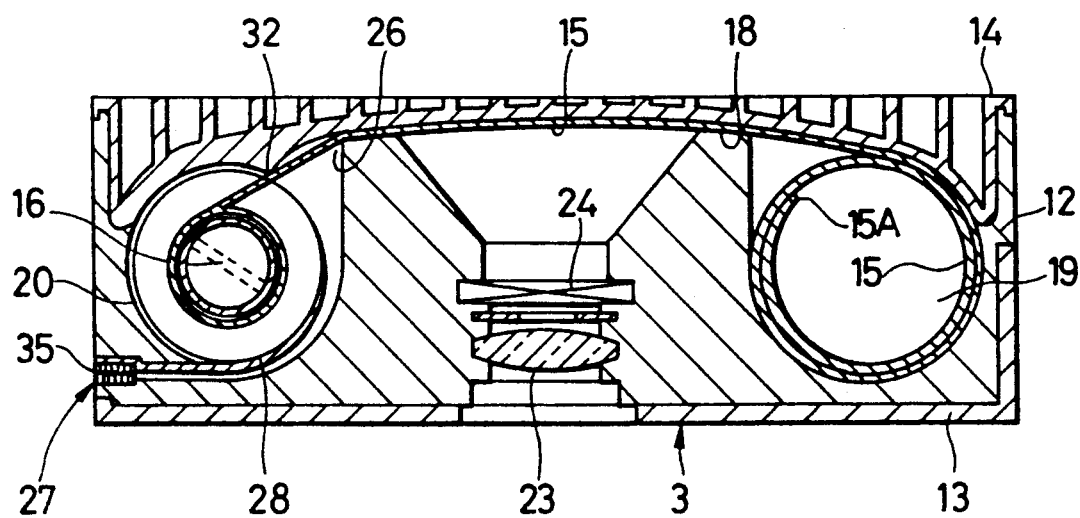
FIG. 5 is a section view taken on line V—V in FIG. 1.
Figure 6:
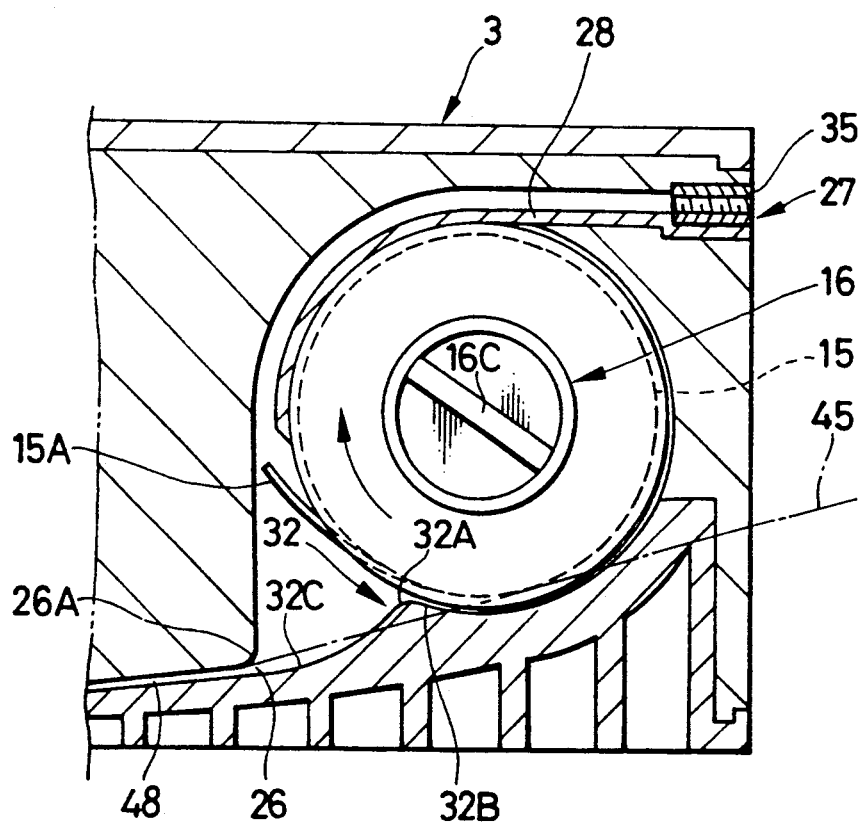
FIG. 6 is a section view illustrating a film take-up chamber illustrated in FIG. 5 in enlargement.

The film unit 2 of the present embodiment is different from conventional film units in the following ways: Firstly, a film outlet 27 is formed on the film take-up chamber 20 which is different from an entrance 26 of the film take-up chamber 20. Secondly, a guide member 28 is provided in the film take-up chamber 20 for guiding the leading end portion 15A toward the film outlet 27 at the time of letting out the film 15. Thirdly, a lower ridge or engaging portion 16A is formed inside on the lower end of the spool 16 for being rotated from the outside of the film unit housing 3 through a hole 29. Fourthly, a hole 31 is formed to insert a release shaft 30 for releasing the lock of the film advancing knob 9 at the time of letting-out as illustrated in FIGS. 2 and 4. Fifthly, a guide member 32 is provided for preventing the leading end portion 15A from being drawn back through the entrance 26 at the time of letting-out as illustrated in FIGS. 5 and 6. Sixthly, the film 15 and the film unit housing 3 are provided with a lowered resistance in dynamic friction between the film 15 and the inner wall of the film unit housing 3 in contact with the film 15.

The film outlet 27 is situated in a position opposite to the entrance 26 of the film take-up chamber 20 with respect to the spool 16, and opens on the lateral side of the film unit housing 3 as illustrated in FIG. 5. Light trapping fabric 35 is attached to the inside of the film outlet 27. In order to let out the film 15 through the film outlet when the film 15, after exposure, is subjected to processing, the external casing 4 is removed from the film unit housing 3.

The guide member 28 is made of a resilient material such as a thin metal plate or a plastic plate so as to press the outer surface of the film 15 wound on the spool 16 toward the spool 16, and serves to prevent the wound film 15 from loosening at the time of reverse rotation of the spool 16. This causes the reverse rotation of the spool 16 to direct the leading end portion 15A to the film outlet 27 by following the rotation of the spool 16.

Figure 13:
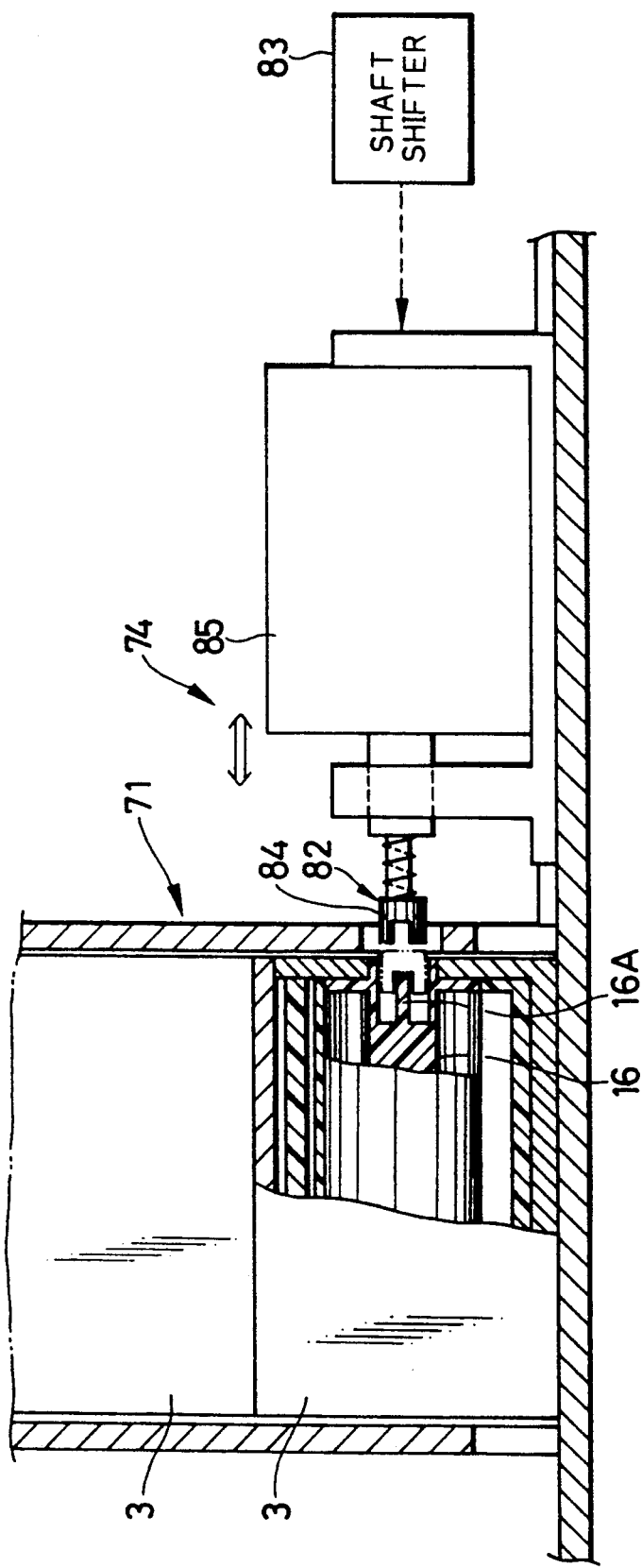
FIG. 13 is a front view illustrating a spool rotating mechanism of the processor illustrated in FIG. 12.

The spool 16 has flanges 16B in the vicinity of both ends as illustrated in FIGS. 2 and 3. The upper end of the spool 16 is provided with an inside ridge 16C for engaging with the fork 9A of the film advancing knob 9 to wind the film 15, whereas the lower end is provided with the inside ridge 16A for engaging with a spool rotating shaft 82 (see FIG. 13) of a film processor to let the film 15 out of the film unit housing 3. The lower end of the spool 16 is rotatably supported in the hole 29 formed on a bottom 14A of the rear cover 14, through which hole 29 the inside ridge 16A is exposed to the outside of the film unit housing 3.

The film advancing knob 9 is formed in the gear shape having teeth 9B on its periphery as illustrated in FIGS. 2 and 4. An arresting member 40 arrests the teeth 9B to prevent the film advancing knob 9 from reverse rotating When the film 15 is let out of the film unit housing 3, the arrest of the teeth 9B by the arresting member 40 is released to make free the film advancing knob 9 by inserting the release shaft 30 into the hole 31. The rotary shaft 82 reverse rotates the spool 16 to push out the leading end portion 15A to the outside of the film unit housing 3 through the film outlet 27.

If the leading end portion 15A of the film 15 is located in the vicinity of the entrance 26, the letting-out might be impossible because a reverse rotation of the spool 16 might cause the leading end portion 15A to come back into or to be caught in the entrance 26. The guide projection 32 as illustrated in FIG. 5 is formed in the vicinity of the entrance 26 for preventing the leading end portion 15A from coming back into the entrance 26. The guide projection 32 is formed to be in the inclined shape of a rounded tip in a section view of FIG. 6, of which a top portion 32A projects toward the spool 16 in an appropriately slight degree over a tangent 45 to the outer periphery of the roll of film 15 from the point of a front edge 26A of the entrance 26 on the side of the main body 12. Guide surfaces 32B and 32C defining the top portion 32A therebetween are formed to be in the smoothly rounded slopes in the section view. The guide surface 32B makes it possible for the leading end portion 15A to easily pass over the top portion 32A at the time of letting out the film 15.

Because the film 15 is so tightly wound in the film take-up chamber 20 as to allow no loosening, pressure is applied to either or both of the emulsion surface and the back surface of the film 15 so that the leading end portion 15A cannot easily be separated by the guide member 28. The emulsion surface of the film 15 is positioned in the exposure station 18 of the film unit housing 3 to fit on the image forming plane between a back plate 47 and guide rails 18A. The film 15 is in contact with the inside of the film take-up chamber 20 while the film 15 is let out thereof through the film outlet 27 by rotation in a direction opposite to the direction of winding on the spool 16 after exposure. A smooth letting-out of the film thus might not be carried out dependent upon a certain value of a coefficient of dynamic friction between the film 15 and the inside surface of the film unit housing 3 in contact with the film 15, and a coefficient of friction between the emulsion surface and the back surface of the film 15.

Accordingly, a resin constructing the contacting plane with the film unit housing 3 of the present invention and the film 15, for example an inner wall of both chambers 19 and 20, and an inner wall of a film passageway 48 may preferably be provided with silicone oil contained therein, which is substantially harmless for the film 15, such as dimethyl polysiloxane or modified silicone oil in which methyl in dimethyl polysiloxane is substituted by carboxyl, for example approximately 0.05–5.0 wt%. A resin used in the film unit housing 3 can be polystyrene, high-impact polystyrene, styreneacrylonitrile copolymer, ABS resin, polypropylene resin, high-density polyethylene resin or bio-decomposable polymer as described in Japanese Patent Appln. No. 1-1696939, and preferably together with adding reinforcing material. The bio-decomposable polymer means a positive biodegradation according to the test of a modified MITI - test (I), OECD test guideline 301C. An example of reinforcing material is glass fiber and carbon fiber.

A film used in the lens-fitted film unit 2 of the present invention has its coefficient of friction on the back surface to the emulsion surface of 0.35 or less, preferably below 0.30 or less, and has slipping characteristics of the friction coefficient between a back surface of photosensitive material and inner wall of the film unit housing 3 of 0.36 or less. The friction coefficient thereof can be measured by substantially substituting the friction coefficient between the back surface and a specifically defined steel ball.

Addition of the above specific slipping characteristics of the present invention to the silver halide photosensitive materials, can be performed by performing the process for decreasing the resistance of slipping frictional resistance on one or both of the two surfaces. Examples of the said process are a method using improving specific slipping characteristics, and a method setting irregularity on a surface using particles. Any method can be used if the friction coefficient between both surfaces becomes 0.35 or less. Preferable examples of substances for improving slipping characteristics on the surface of photosensitive materials used in the present invention are organic silicone compound such as dimethyl polysiloxane as described in U.S. Pat. Nos. 3,042,522, 3,080,317, 4,004,927 and 4,047,958, higher fatty acids or salt thereof as described in U.S. Pat. No. 2,976,148, higher fatty acid amide as described in U.S. Pat. Nos. 2,732,305 and 4,275,146, higher fatty acid ester or higher aliphatic alcohol ester as described in U.S. Pat. No. 3,121,060, and Japanese Patent Examined Publication Nos. 49-46258, 50-40664, 57-9057, and 58-33541, and paraffin or wax as described in U.S. Pat. Nos. 3,786,002 and 3,779,771. Among them ester of organic silicone compound or ester of higher fatty acid such as $C_{12-70}$, or ester of higher aliphatic alcohol such as $C_{12-70}$ is more preferable.

In order to add the specific slipping characteristics of the present invention using the above mentioned preferable compound, the compound hereinabove is preferably added in the one or both of the surface layers of the emulsion surface and the back surface. Generally, the surface layer of the emulsion surface is constructed with a protective layer prepared by hydrophilic colloidal liquid such as gelatin. The back layer can be constructed with the layer in which hydrophilic colloid such as gelatin is a binder or hydrophobic substance such as cellulose diacetate is a binder. Further, the additional layer containing compound of the present invention can be set on one or both of the protective layer and back layer.

In practice of the present invention, the coating solution for a photographic surface layer such as hydrophilic colloidal solution for preparing the protective layer and various coating solutions for preparing the back layer, to which the compound used in the present invention is added, is coated. Otherwise the compound used in the present invention is overcoated on or penetrated into the protective layer. A preferable compound used in the present invention can be added in the form of a previously prepared aqueous dispersion in the presence of a suitable dispersant to the hydrophilic colloidal coating solution, or can be added directly to the solution in the presence of suitable dispersant or can beaded after diluting with organic solvent which can dissolve the compound having slipping characteristics. The compound can be added by dissolving it in organic solvent. The thus prepared solution is then added to the organic type coating solution such as back layer. The coating solution to which the compound used in the present invention is added, can be coated or penetrated by means of the dipping as described in U.S. Pat. No. 3,335,026 or the spraying as described in U.S. Pat. No. 2,674,167.

These compounds which are used for the protective layer are preferably used together with hydrophilic colloid, for example gelatin, colloidal albumin, caseine, cellulose derivative such as carboxymethylcellulose or hydroxyethylcellulose, saccharide derivative such as agar, sodium arginate or starch derivatives, or synthetic hydrophilic colloid such as poly(vinyl alcohol), poly(N-vinylpyrrolidone), polyacrylate copolymer, and polyacrylamide or its derivative or partial hydrolyzate thereof. Compatible mixture of over two colloids is used if required. Among these, the most preferably used is gelatin.

Preferable examples of binder having membrane forming ability used together with applying these compound to a back surface are cellulose esters such as cellulose triacetate, cellulose diacetate, cellulose acetate maleate, cellulose acetate phthalate, hydroxyalkyl alkylcellulose phthalate ($C_{1-4}$ alkyl), hydroxyalkyl alkylcellulose tetrahydrophthalate ($C_{1-4}$ alkyl), or hydroxyalkyl alkylhexahydrophthalate ($C_{1-4}$ alkyl); poly-condensation polymer such as a polycondensate of formaldehyde with cresol, salycilic acid or oxyphenyl acetate, or a polycondensate of terephthalate or isophthalate with polyalkyleneglycol (di-, tri- and tetramer of ethyleneglycol or propyleneglycol); a copolymer of homopolymer of acrylate, methacrylate, styrenecarboxylate or styrenesulfonate, or monomer thereof, or maleic anhydride, with styrene derivative, alkylacrylate ($C_{1-4}$ alkyl), alkylmethacrylate ($C_{1-4}$ alkyl), vinyl chloride, vinyl acetate, alkylvinyl ether ($C_{1-4}$ alkyl) or acrylonitrile, or ring-opening semi esters or semi amides thereof, or partial hydrolyzate of polyvinyl acetate; synthetic polymer such as homopolymer or copolymer obtained from monomer having polymerizable unsaturated bond such as polyvinyl alcohol.

Water, organic solvent or a mixture thereof can be used as a solvent for binder. Organic solvents aforementioned and described herein contain the following solvents. Examples thereof are alcohol such as methanol, ethanol or butanol, ketone such as acetone or methyl ethyl ketone, halogenized carbohydrate such as methylene chloride, carbon tetrachloride or chloroform, ethers such as diethyl ether, dioxane or tetrahydrofuran, aromatic hydrocarbon such as benzene, toluene or xylene, alicyclic hydrocarbon such as cyclopentane or cyclohexane, and aliphatic hydrocarbon such as n-hexane or n-octane.

The amount of addition of these compounds is 0.1-20%, or preferably 1-10% with respect to a total weight of the binder.

An irregularity on a surface of the photosensitive material can be prepared by using fine powder grains (hereinafter designated as mat agent) as described in U.S. Pat. No. 3,849,191, British Pat. 1,293,189, Japanese Patent Laid-open Publication Nos. 60-188942, 61-219019 and 61-284761.

preferable examples of an organic compound type of mat agent are water dispersible vinyl polymer such as poly(methyl methacrylate), cellulose acetate propionate or starch. Preferable examples of inorganic types thereof are carbon powder, silver halide, strontium barium sulfate, calcium carbonate, silicon dioxide, magnesium oxide or titanium oxide. Mat agent in spheric shape of water dispersible vinyl polymer comprising homopolymer of acryl ester such as methyl methacrylate, glycidylacrylate or glycidyl methacrylate, or copolymer thereof with these acryl esters or another vinyl monomer is preferable.

Fine grain powder of carbon or graphite is most effective although it can only be used on the back layer due to its light shielding characteristic.

The amount of mat agent to be added is 0.01-1 $g/m^2$, preferably 0.1-0.5 $g/m^2$ of photosensitive material.

Combined application of the mat agent with slipping agent hereinbefore mentioned are not only allowable but recommendable often to provide a synergistic effect.

In the present invention, the above mentioned treatment can effectively be performed on both surfaces of the photosensitive material, however an effect of the present invention can be achieved by performing the treatment on one of the two surfaces if a friction coefficient between both surfaces is kept from 0.10 to 0.35. A coefficient of friction 0.30 or less is preferable. A degree of slipping on each surface can be known by measuring a coefficient of friction with respect to a steel ball in prevalent use. The coefficient of friction determined by this method is preferably 0.36 or less and the friction coefficient between surfaces of the photosensitive material is more preferably 0.35 or less.

A specific feature of the present invention lies not only in improving the slipping characteristics of the back surface of the photosensitive material but also in decreasing the frictional resistance in a state wound in a free roll of the photosensitive material, i.e., the frictional resistance between the emulsion surface and the back surface. More preferably the frictional resistance of back surface on the steel ball is set to be equal or lower as compared with that between the emulsion surface and the back surface.

In each part of the film unit housing 3, carbon black is mixed for light shielding and prevention of flare which may occur at the exposure to create an image. It is preferably mixed so as to realize a spectral reluctance factor density in an inner wall of exposure aperture at 1.2 or more, preferably at 1.4 or more.

In the present invention, furnace carbon black is preferable in the point of light shielding property, cost and improving physical property, and further preferable examples though expensive are acetylene carbon black as coloring substance having antistatic effect, electrically conductive carbon black or Metchen carbon black as denatured by-product carbon black. Two of those carbon blacks preferably can be mixed as required.

A preferable amount to be added is 0.05-15 wt%. Plasticizer, stabilizing agent, antistatic agent, filler, antioxidant or coupling agent can be used.

The parts for constructing the film unit housing 3 of the present invention can be manufactured by the following molding processes 2 to 12. The light trapping fabric can be manufactured by the process 1.

Figure 7:
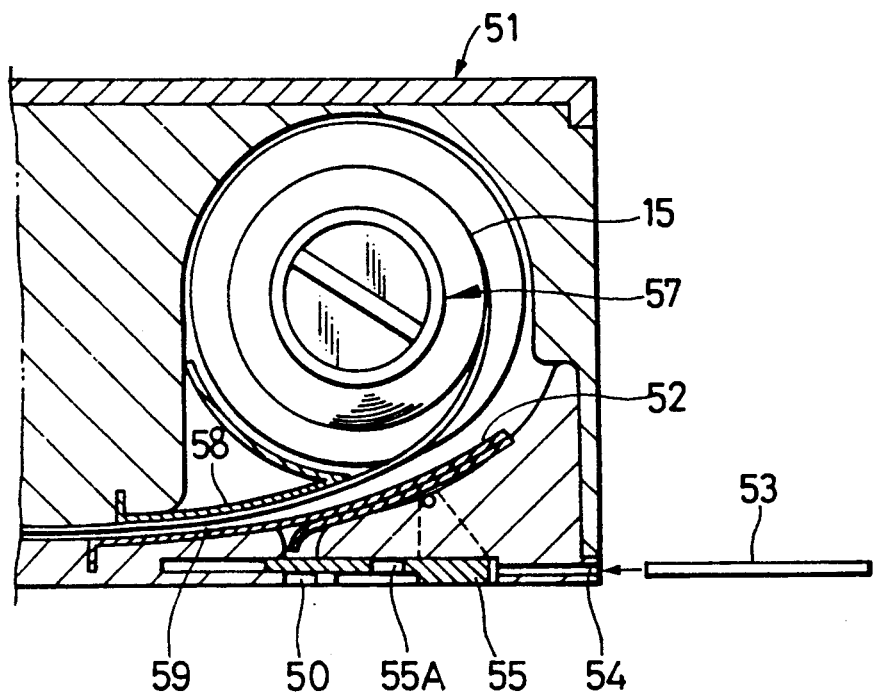
FIGS. 7 and 8 are enlarged section views illustrating a film take-up chamber of a film unit in accordance with another preferred embodiment.
Figure 8:
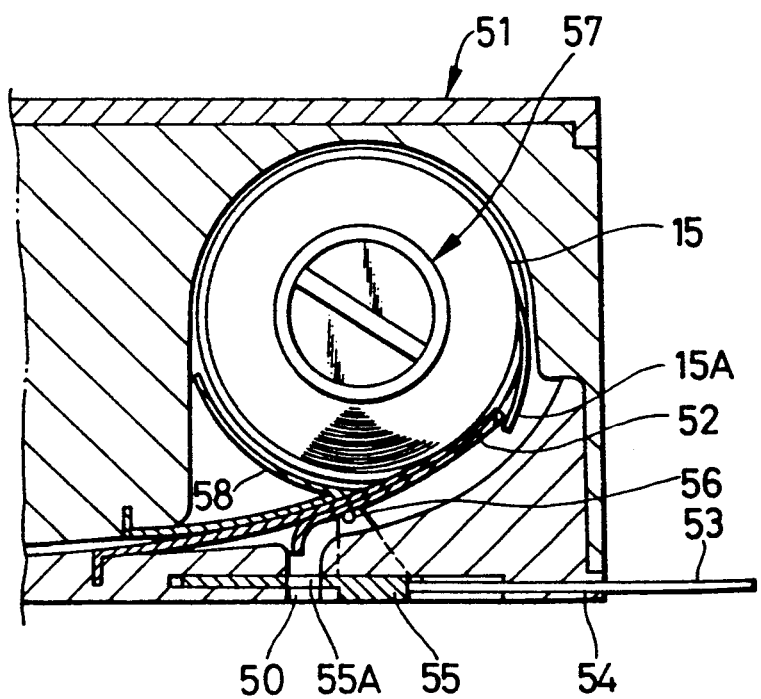

1) Spinning/conversion (nonwoven fabric, light trapping fabric)
2) Laminate molding
3) Slot die extrusion
4) Calendaring (sheet)
5) Compression molding
6) Transfer molding
7) Injection molding
8) Flash molding
9) Extrusion
10) Blow molding
11) Blown-film inflation
12) Expansion molding Although the film outlet 27 is formed on a lateral side of the film unit housing 3 in the above embodiment, a film outlet 50 may be formed on the rear side of the film unit housing 51 as illustrated in FIGS. 7 and 8. This film outlet 50 is normally shielded from light by a light-shielding member 52 having a spring property as illustrated in FIG. 8. Where the film is let out, a pressing plate 53 is inserted in a slit 54 to slide a light-shielding plate 55. The film outlet 50 is fitted with an opening 55A of the light-shielding plate 55 to open the film outlet 50. The slide of the light-shielding plate 55 causes a pin 56 in linkage therewith to press the light-shielding member 52 toward a spool 57. The movable portion of the light-shielding member 52 is in contact with the outer periphery of the film 15 in roll. The tip of the light-shielding member 52 guides the leading end portion 15A of the film 15 toward the film outlet 50 at the time of reverse rotating the spool 57. The middle of the light-shielding member 52 is in contact with an end of a guide plate 58 to close an entrance 59 of the film take-up chamber. Accordingly, the leading end portion 15A is prevented from coming into the entrance 59 even upon reverse rotating the spool 57. Reverse rotation of the spool 57 causes the leading end portion 15A to be let out through the film outlet 50 by the guide of the guide plate 58.

Figure 9:
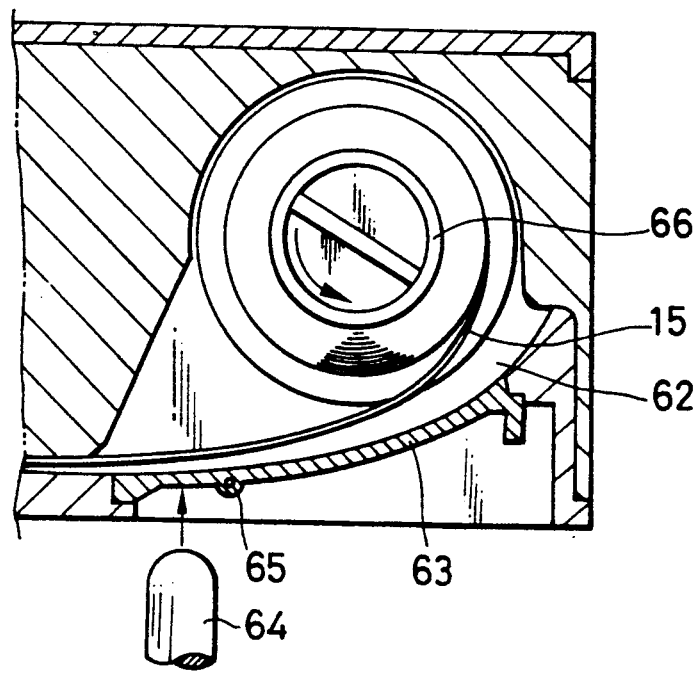
FIGS. 9 and 10 are enlarged section views illustrating a film take-up chamber of a film unit in accordance with a further preferred embodiment.
Figure 10:
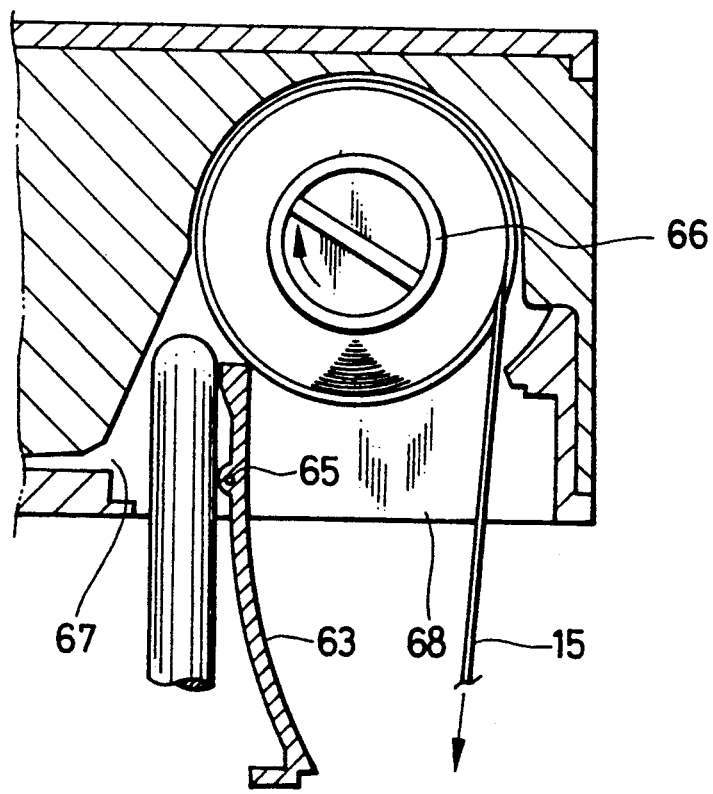

Referring to FIGS. 9 and 10, a back door 63 may be openably provided on the back of a film take-up chamber 62. A guide for the film 15 is constituted by an inside of a retractable portion of the door 63 in an open state. When the door 63 is pressed with a pressing shaft 64, the door 63 is rotated around a shaft 65 to be open. By means of a door 63 in the open state, the leading end portion 15A will not be drawn back in an entrance 67 of the film take-up chamber even while reverse rotating a spool 66, but reliably will be let out through a film outlet 68 to the outside of the film unit housing 69.

Figure 11:
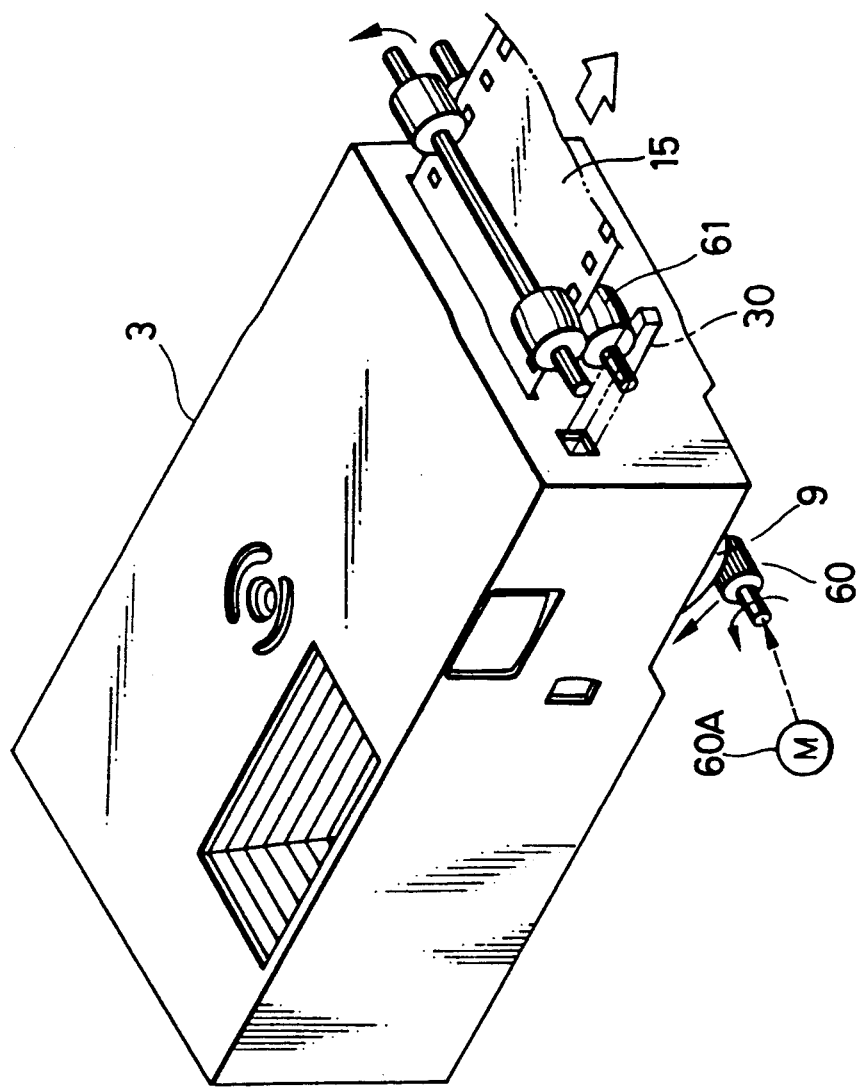
FIG. 11 is a perspective view illustrating a film unit in accordance with yet another preferred embodiment.

The above-described embodiments are provided with the ridge 16A on the lower end of the spool 16 which is exposed to the outside of the film unit housing 3. Alternatively the spool 16 may be reverse rotated by a gear 60 by use of the film advancing knob 9 in mesh with its teeth 9B. The film advancing knob 9 is released from the arresting member 40 by the release shaft 30, before the gear 60 is rotated by a motor 60A. The leading end portion 15A let out of the film unit housing 3 is directed toward a processor by a pair of pull rollers 61 (see FIG. 11). This construction needs no hole such as the hole 29 for exposing the ridge 16A to the outside, thereby to simplify the film unit housing without an extra member for keeping a light-tight state.

Although the present invention is applied as a lens-fitted photographic film unit 2 in the above embodiments, it is also applicable to a film unit without a photo-taking mechanism, e.g., a 110-type film cassette, which is used by loading it in a camera. After exposing the film in the 110-type cassette, the cassette is unloaded from the camera and brought to a laboratory, where the film is let out of a body of the 110-type cassette by rotating a spool in the direction reverse to winding up the film on the spool.

Such a 110-type cassette may be incorporated in a lens-fitted photographic film unit. Although the cassette is unloaded from the film unit by breaking a film unit housing, the film is let out of the 110-type cassette without breaking a body of the cassette, so that it is possible to reduce the number of times of breaking the components of the lens-fitted film unit from two times to one time.

It is noted that a photo-taking mechanism herein must satisfy conditions of exposure for taking a photograph by operating a shutter: a condition of harmonizing a lens number, a shutter speed and a film sensitivity; a condition of setting the photosensitive plane of film on the focal plane; and a condition of showing the same image in a viewfinder as that to be taken. The photo-taking mechanism includes a taking lens, a diaphragm, a shutter, a viewfinder and a film wind-up device. The taking lens is constituted by one spherical or preferably aspherical lens element, and may be either a single lens or, as required, plural lenses which serve for exposure of a plurality of frames at the same time. The focal length of the taking lens is set within a range from 10 to 100 mm, preferably from 20 to 90 mm, much preferably from 25 to 40 or from 60 to 90 mm. If a taking lens of 40 mm or more is used, the Z-shaped optical axis method can be used for making the film unit housing compact, in which method at least two mirrors are applied for reflecting light in the shape of a letter Z. For stereoscopic photography, a film unit including at least twin lenses is used. The shutter is preferably a lens shutter, especially a shutter of a fixed shutter speed from 1/250 to 1/100 second. When plural lenses are provided, respective shutters provided correspondingly for each lens are preferably operated with a single shutter release button in a simultaneous manner or in a successive manner following a predetermined order of time points. It is advantageous to provide the view finder with a lens, a mark of center and an image frame within a finder frame in order to be free from an influence of parallax with respect to the image frame to be taken. Further, an auxiliary illuminating unit can be added to the photo-taking mechanism of the present invention. The details are described in Japanese Patent Laid-open Publications Nos. 1-152437, 1-93723 and 1-96647.

2. Description of a Film Processor

Figure 12:
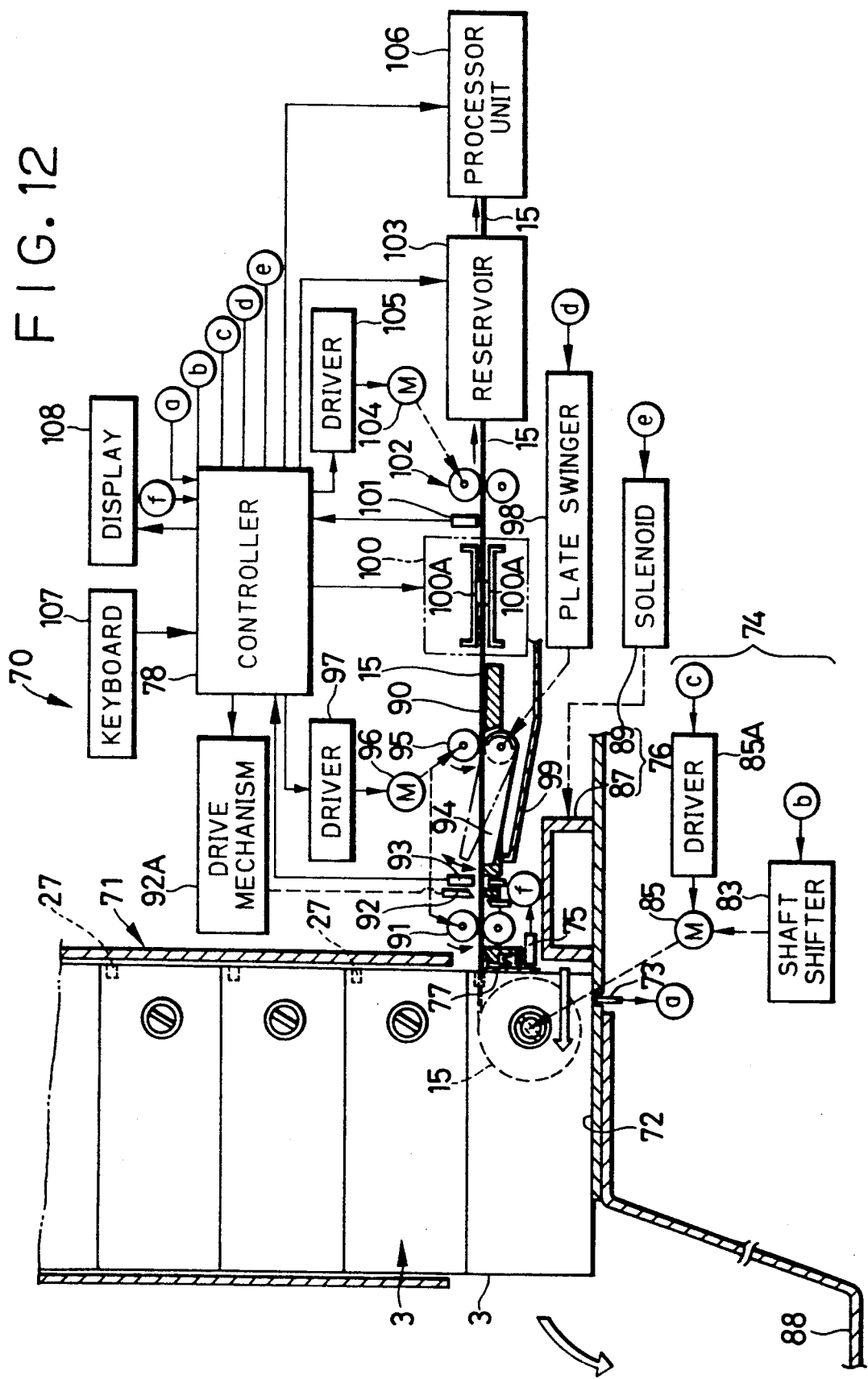
FIG. 12 is a schematic diagram illustrating a film processor for use with the film unit illustrated in FIG. 1.

The lens-fitted photographic film unit 2 after photo-taking is brought into a laboratory, where the film unit housing 3 is removed from the external casing 4. The film unit housing 3 with the exposed film 15 is loaded in a housing holder 71 of a film processor 70 as illustrated in FIG. 12, where the film 15 is taken out and subjected to processing.

The housing holder 71 is formed in the shape of a rectangular elongated box and is attached to the is frame of the film processor 70 along the vertical direction. A plurality of film unit housings 3 are contained in the housing holder 71 with their film outlets 27 directed in the same direction.

A film pull stage 72 is provided on the bottom of the housing holder 71. The lowest of the film unit housings 3 in the housing holder 71 is placed and remains on the film pull stage 72 by its own weight. On the film pull stage 72, there are disposed a housing sensor 73 for sensing the film unit housing 3 on the film pull stage 72, a spool rotating mechanism 74, a trailing end sensor 75 and a housing ejector 76.

The trailing end sensor 75 is constructed of a microswitch. A coiled spring 77 is disposed close to the trailing end sensor 75, and prevents the film unit housing 3 from being moved in the direction the same as feeding the film 15 when the film 15 is drawn out. When the film unit housing 3 is displaced in the film feeding direction against the pressing force of the coiled spring 77, the trailing end sensor 75 is actuated. The position of mounting the trailing end sensor 75 is determined so as to meet this purpose. It is possible to detect the trailing end 15B from displacement of the film unit housing 3 at the time when the whole of the film 15 is drawn out. Detection signals from the trailing end sensor 75 and the housing sensor 73 are supplied to a controller 78.

The spool rotating mechanism 74 (see FIG. 13) consists of a shaft 82 for rotating the spool 16 in the feeding direction with a fork 84 in mesh with the ridge 16A of the spool 16, and a shaft shifter 83 for shifting axially the shaft 82 in the direction along the spool 16. The shaft 82 is rotated by a stepping motor 85. The stepping motor 85 is controlled by the controller 78 as to rotate through a driver 85A. The shaft shifter 83 is constituted by a motor and a link mechanism (not shown) for converting the rotation of the motor into a reciprocal movement, and is controlled by the controller 78. It is noted that the processor is also provided with the release shaft 30 for releasing the lock of the film advancing knob 9, and a solenoid for pushing the release shaft 30, though they are not shown in the drawings.

The housing ejector 76 as illustrated in FIG. 12 consists of a housing pushing member 87 and a solenoid 89 for shifting the housing pushing member 87 in the direction opposite to feeding the film 15 in order to throw down the empty film unit housing 3 after drawing out the film 15 from the film pull stage 72 to a receiving tray 88.

A film passageway 90 is formed horizontally to receive the film outlet 27 of the film unit housing 3 positioned on the film pull stage 72. A first roller pair 91 is disposed in a position close to the film outlet 27 along the film passageway 90, which is provided also with a cutter 92, a leading end sensor 93 for detecting the leading end portion 15A, a guide plate 94, and a second roller pair 95.

The first and second roller pairs 91 and 95 are rotated by a stepping motor 96 in synchronism. The stepping motor 96 is controlled by the controller 78 through a driver 97. The first roller pair 91 is provided with a nip releasing mechanism (not shown) for releasing the film 15 from the nip of the first roller pair 91 by raising its upper roller. The cutter 92 is controlled by the controller 78 through a drive mechanism 92A.

The guide plate 94 is swung upwardly by a plate swinger 98 while the leading end portion 15A passes the guide plate 94, and guides the leading end portion 15A to a throwaway passage 99. After the leading end portion 15A is cut off by the cutter 92, the guide plate 94 is swung downwardly to an initial position by the plate swinger 98 to stop up the throwaway passage 99, and guides the film 15 to a splice unit 100.

The splice unit 100 splices the trailing end portion 15B of the preceding film 15 to a film leader of the following film 15 with splice tape 100A, and is constituted by a film splice device as described in detail in Japanese Patent Examined Publication Nos. 55-13346 and 59-28902 among others. In a downstream position of the splice unit 100, a film sensor 101 is disposed for detecting whether any film precedes the film 15. Such a signal of detection of precedent film is supplied to the controller 78 by the film sensor 101. The film 15 passed through the splice unit 100 is fed by a third roller pair 102 toward a reservoir 103. The third roller pair 102 is rotated by a stepping motor 104, which is controlled by the controller 78 through a driver 105. The reservoir 103 provisionally stores the film 15 and then feeds it to a processor unit 106.

The controller 78 is constituted by a well-known microcomputer, and sequentially controls related circuits in accordance with a program contained in a memory incorporated therein. There are a keyboard 107 for inputting a selection of modes and an actuation of circuits, and a display 108 for displaying inputs supplied from the keyboard 107, both connected to the controller 78, of which the operation follows the flow illustrated in FIG. 14, with reference to which the controlling procedure in the controller 78 is now described.

With the external casing 4 removed, a plurality of film units 2 after exposure are loaded in the loading state 71. When a main switch of the processor 70 is turned on, the controller 78 sets the related circuits at the initial state, in which the controller 78 actuates the guide plate 94 through the plate swinger 98. The guide plate 94 is swung upwardly to guide the leading end portion 15A to the side of the throwaway passage 99. When a start key of the keyboard 107 is operated, the controller 78 actuates the spool rotating mechanism 74 in accordance with a detection signal from the housing sensor 73. The shaft 82 is inserted in an end of the spool 16 by driving the shaft shifter 83, and is rotated in the direction of feeding the film 15. Because the film 15 is prevented from loosening by the guide member 28, a rotation of the spool 16 is transmitted to the leading end portion 15A, which is advanced through the film outlet 27 along the inner wall of the film take-up chamber 20.

In linkage with rotation of the shaft 82, the controller 78 controls the first and second roller pairs 91 and 95 to rotate. During this rotation, the leading end portion 15A is nipped by the first roller pair 91. The nip of the leading end portion 15A with the first roller pair 91 is detected by the leading end sensor 93. Upon this detection, the controller 78 stops the shaft 82 from rotating, and controls the shaft shifter 83 to detach the shaft 82 from the end of the spool 16. The spool 16 becomes free thereby. The film 15 is drawn out of the film unit housing 3 by the first roller pair 91.

The controller 78 starts measuring the amount of feeding the film 15 at the timing of detecting the leading end portion 15A. The measurement of the film feeding amount is performed by counting drive pulses of the stepping motor 96 rotating roller pairs 91 and 95. At the timing when the film feeding amount with respect to the position of the cutter 92 becomes L1, or a length of the leading end portion 15A to be thrown away, the controller 78 stops the roller pairs 91 and 95 from rotating, and controls the cutter 92 to cut off the leading end portion 15A, which is a treatment of the leading end for the purpose of convenience in splicing the film leader. The counter for measuring the film feeding amount is reset in accordance with the film cutting signal, and restarts measuring the film feeding amount.

After the leading end portion 15A is cut off, the leading end portion 15A is drawn and thrown away in the throwaway passage 99. The controller 78 then turns off the guide plate 94, and causes the second roller pair 95 to rotate so as to guide the film leader after treatment toward the splice unit 100. The controller 78 judges by means of the film sensor 101 whether the preceding film 15 remains in the splice unit 100. If no preceding film is in the splice unit 100, then the film 15 is fed without intermission. When preceding film is in the splice unit, 100, the roller pairs 91 and 95 are stopped at the timing when the film feeding amount becomes a predetermined length L2, at which the film leader is set in a splice position in the splice unit 100. The splice unit 100 is actuated to splice the film trailer of the preceding film to the film leader of the following film 15. The controller 78 causes the roller pairs 91 and 95 to rotate after the splice and to draw the film 15 further out of the film unit housing 3. At the timing when the film 15 is drawn out up to the whole length of a filmstrip in the film unit housing 3, the trailing end sensor 75 is actuated to cause the controller 78 to stop the roller pairs 91 and 95 from rotating and to actuate the cutter 92. The counter for measuring the film feeding amount is reset upon the film cutting signal, and restarts measuring the film feeding amount. The film 15 is released from the nip of the first roller pair 91 to actuate the housing ejector 76. The solenoid 89 is turned on to shift the housing pushing member 87 in the direction opposite to the feeding direction. The empty film unit housing 3 is ejected from the film pull stage 72 to fall in the receiving tray 88. The film trailer of the film 15 separated from the spool 16 is fed toward the splice unit 100 by rotation of the second roller pair 95. At the timing when the film feeding amount becomes a predetermined length L3, the second roller pair 95 is stopped from rotating to position the film trailer in a splice position in the splice unit 100.

After ejecting the empty film unit housing 3, the housing pushing member 87 returns to its initial position, while a second film unit housing falls down by its weight and is set on the film pull stage 72. Repetition of drawing out and splicing film creates an elongated filmstrip, which passes through the reservoir 103, and is supplied and processed in the processor unit 106, as illustrated in FIG. 12. The elongated filmstrip after processing is dried and then wound on a reel in a roll. The processed elongated filmstrip wound on a reel is subjected to film inspection in a film inspecting device, positioned in a printer with density and color correction values inputted frame by frame from the film inspecting device, and is subjected to printing to expose respective frames on to color paper.

Instead of the above processor for processing an elongated filmstrip after splicing film, a film processor 110 for processing at once two strips of film by use of a leader sheet is now described with reference to FIG. 15. A sheet holder 120 contains leader sheets as shown, of which the lowest leader sheet 121 is separately drawn by a drawing roller 122 out of the sheet holder 120. A roller pair 123 is rotated at an amount predetermined according to that of the drawing roller 122 so as to feed the leader sheet 121 toward a positioning roller pair 124. In the upstream position of the positioning roller pair 124, a sheet sensor 125 is disposed for detecting the leader sheet 121. At the timing when the sheet sensor 125 detects the front end of the leader sheet 121, the positioning roller pair 124 starts rotation to feed the leader sheet 121 to a splice unit 130 similar to the splice unit 100. At the timing when the rear end of the leader sheet 121 passes the leader sensor 125, the positioning roller pair 124 stops after a slight rotation of a predetermined amount, and positions the front end of the leader sheet 121 in the splice position of the splice unit 130.

Figure 15A:
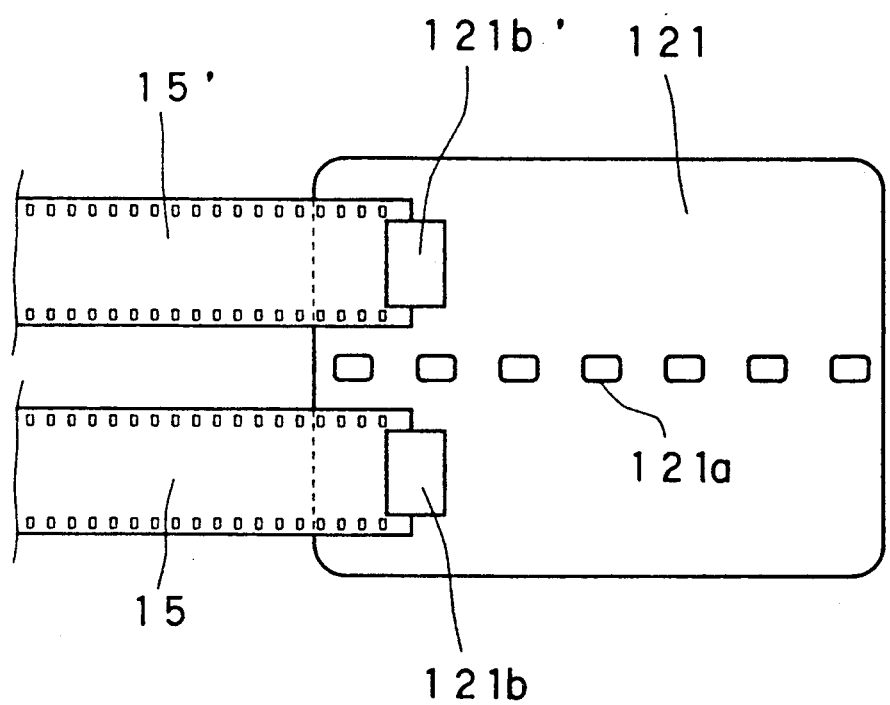
FIG. 15A is a top view of a leader sheet spliced with two strips of film in a parallel arrangement.

On the opposite side of the splice unit 130, there is arranged a housing holder 126 for loading film unit housings, which housing holder illustrated in FIG. 15 is one of the two housing holders actually incorporated in the processor 110. The film leader is let out to the splice unit 130 by a spool rotating mechanism 131 in the direction opposite to the leader sheet 121 from the film unit housing 3 in the housing holder 126. The spool rotating mechanism 131 is constructed in the same manner as that 74 in the above embodiment. By means of the same mechanism for treating the film leader as illustrated in FIG. 12, the leading end portion 15A is cut off, after which the film leader is fitted on the front end of the leader sheet 121. The splice unit 130 splices the film leader to the leader sheet 121, to which actually film leaders of two filmstrips 15 and 15 are spliced (see FIG. 15A). The leader sheet 121 has a series of holes 121a arranged in the middle for being in mesh with the claws of endless guide belts 137 and the teeth of the sprocket gears. On the leader sheet 121, the two films 15 and 15' are spliced by means of splice tapes 121b and 121b'. The splice tapes 121b and 121b' are attached by the splice unit 130.

The leader sheet 121 with the film leader spliced is fed to a processor unit 135 by rotating the positioning roller pair 124 reverse to the initial rotation. In the processor unit 135, a well-known film transporting device 136 is disposed for transporting the film 15 with the leader sheet 121 to relevant processing tanks. The film transporting device 136 is provided with the endless guide belts 137 for guiding the leader sheet with the film toward the processing tanks with its projections in mesh with the hole of the leader sheet, as described in Japanese Patent Laid-open Publication No. 60-191257.

When the whole strip of the film 15 is drawn out of the film unit housing 3 during processing the film 15 in the processor unit 135, a trailing end sensor 138 is turned on for detecting the trailing end portion 15B so as to cut it off by a cutter 139 to separate the film 15 from the film unit housing 3.

The film 15 processed in the processor unit 135 is accumulated in an accumulator 140, and set in a well-known printer to effect printing. The empty film unit housing 3 separated from the film 15 is ejected to a receiving box 141. Upon this ejection another film unit housing is positioned on the film pull stage 52 by its own weight. In a manner similar to the above, the leader sheet 121 is set in the splice unit 130, spliced to the film leader let out of the film unit housing 3, and transported therewith to the processor unit 135.

Figure 16:
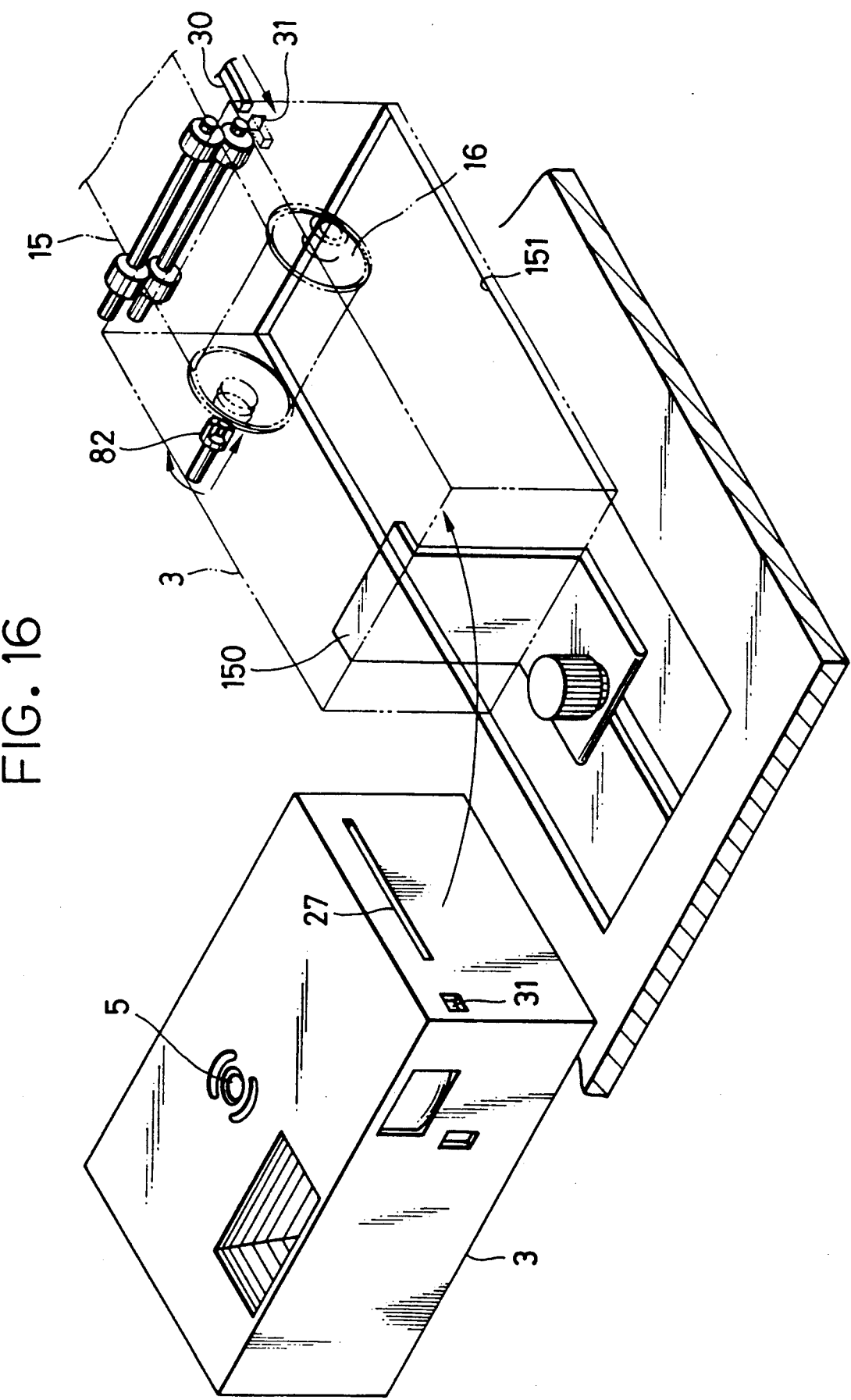
FIG. 16 is a perspective view illustrating a processor in accordance with still another preferred embodiment with the film unit of FIG. 1 positioned therein.

Although each film unit housing 3 is automatically positioned on the film pull stage 52 by applying the housing holder 71 or 126 where the film unit housing 3 is inserted one after another, alternatively the film unit housing 3 may be manually positioned in a film pull stage 151 by fixing it with a bracket 150 as illustrated in FIG. 16. The release shaft 30 is inserted through the hole 31 in the film unit housing 3 on the film pull stage 151, and disengages the film advancing knob 9 to release the spool 16. The shaft 82 engages with the ridge 16A of the spool 16. The shaft 82 reversely rotates the spool 16 to let out the leading end portion 15A. The s leading end portion 15A let out is nipped by the first roller pair 91 and sent to the processor unit. The fixing position of the bracket 150 is variable, so that it is possible to position a film unit housing even of a long size with an electronic flash unit incorporated therein.

3. Explanation on Color Photosensitive Materials

A silver halide photosensitive material of the present invention is preferably of light sensitivity ISO-100 or higher, more preferably ISO-320-1600, and is monochrome photosensitive material, and color photosensitive material.

A photosensitive material of the present invention is made with the support and is constructed of at least one layer of blue-sensitive silver halide emulsion layer, green-sensitive silver halide emulsion layer or red-sensitive silver halide emulsion layer. There is no limitation on the number and order of layers of silver halide emulsion layers and non-photosensitive layers. A typical example thereof is a silver halide photosensitive material having at least one photosensitive layer comprising a plurality of silver halide emulsion layers, which are substantially equal in color sensitivity but different in photosensitivity, which photosensitive layer is a unit photosensitive layer having color sensitivity to any of blue-, green- and red-light. In a multi-layer silver halide photosensitive material, an arrangement of unit photosensitive layer, in general, is set in the order of red-sensitive layer, green-sensitive layer and blue-sensitive layer from the support. The order thereof can be reversed, and a setting order, in which a different photosensitive layer is inserted in the equal color sensitive layers, can also be set up. Non-photosensitive intermediate layers can also be set between silver halide photosensitive layers and at the uppermost and lowest layers thereof.

Couplers and DIR-compounds as described in Japanese Patent Laid-open Publication Nos. 61-43748, 59-113438, 59-113440, 61-20037 or 61-20038 can be incorporated in the said intermediate layers, and general color mixture inhibitor can also be incorporated therein.

The plurality of silver halide emulsion layers constituting each unit photosensitive layer preferably can be comprised with double layer construction of high-sensitive emulsion layer and low-sensitive emulsion layer as described in German Patent No. 1,121,470 and British Patent No. 923,045. It is preferable to arrange the layers in order of decreasing photosensitivity toward the support. Non-photosensitive layers also can be set up between the silver halide emulsion layers. The less-sensitive emulsion layer can also be set distant from the support and the high-sensitive emulsion layer close to the support, as described in Japanese Patent Laid-open Publication Nos. 57-112751, 62-200350, 62-206541 and 62-206543.

For example, the layers can be set, at most distant from the support, in the order of low-sensitive blue-sensitive layer (BL)/high-sensitive blue-sensitive layer (BH)/high-sensitive green-sensitive layer (GH)/low-sensitive green-sensitive layer (GL)/ high-sensitive red-sensitive layer (RH)/low-sensitive red-sensitive layer (RL), or in the order of BH/BL/GL/GH/RH/RL, or in the order of BH/BL/GH/GL/RL/RH.

The layers also can be set, at most distant from the support, in the order of blue-sensitive layer/GH/RH/GL/RL, as described in Japanese Patent Examined Publication No. 55-34932.

Further, the layers also can be set, at most distant from the support, in the order of blue-sensitive layer/GL/RL/GH/RH, as described in Japanese Patent Laid-open Publication Nos. 56-25738 and 62-63936.

Also, as described in Japanese Patent Examined Publication No. 49-15495, an arrangement consisting of three different photosensitive layers in order of lower photosensitivity toward the support, in which the upper layer is the most photosensitive silver halide emulsion layer, the intermediate layer is a less photosensitive silver halide emulsion layer than the upper, and the lower layer is a still less photosensitive silver halide emulsion layer than the intermediate. These different photosensitivities of three layers can also be set in the arrangement, in the order of distant side from the support, the intermediate-sensitive emulsion layer/high-sensitive emulsion layer/low-sensitive emulsion layer within equal color sensitive layer as described in Japanese Patent Laid-open Publication No. 59-202464.

Various arrangements, for example, in the order of high sensitive emulsion layer/low-sensitive emulsion layer/intermediate-sensitive emulsion layer, or low-sensitive emulsion layer/intermediate-sensitive emulsion layer/high sensitive emulsion layer can be set up.

Four layers or more can also be arranged in various orders.

In order to improve color reproducibility, main photosensitive layers such as BL, GL and RL and donor layer (CL) having interlayer effect with different spectral sensitivity distribution are preferably set attached to or nearly attached to the main photosensitive layer, as described in U.S. Pat. Nos. 4,663,271, 4,705,744, 4,707,436, Japanese Patent Laid-open Publication Nos. 62-160448 and 63-89580.

As illustrated hereinabove, various arrangements of layers and constructions of each photosensitive material can be selected.

A preferred silver halide, which is contained in the photographic emulsion layer of the photosensitive material used in the present invention, is silver bromoiodide, silver chloroiodide or silver bromochloroiodide containing approximately 30 mole % or less of silver iodide. A particularly preferred silver halide is silver bromoiodide or silver bromochloroiodide containing approximately 2 to 25 mole % of silver iodide.

Silver halide grains in the photographic emulsion may be of regular forms such as cubic, octahedral or tetradecahedral grains, of irregular forms such as spherical or tabular grains, of crystal defect such as crystal twinning, or of complex forms thereof.

The size of the silver halide grains is not limited, for example the size may vary from fine-grain of approximately 0.2 $\mu$m or less to large size grain of 10 $\mu$m in projected surface area, and there may be a polydispersed emulsion or monodispersed emulsion.

The silver halide photographic emulsion in the present invention can be prepared in any manner, e.g., by the method as described in Research Disclosure (R. D.) No. 17643 (December, 1978), pp. 22–23, "I. Emulsion Preparation and Types", ibid. No. 18716 (November 1979), p.648, P. Glafkides, *Chimie et Physique Photographique*, Paul Montel (1967), G. F. Duffin, *Photographic Emulsion Chemistry* (Focal Press, 1966) and V. L. Zelikman et al., *Making and Coating Photographic Emulsion*, (Focal Press, 1964).

A monodispersed emulsion as described in U.S. Pat. Nos. 3,574,628, 3,655,394 and British Patent No. 1,413,748 is preferable.

It is preferable to use tabular grains having an aspect ratio of approximately 5 or more. Tabular grains can easily be prepared by the method as described in Gutoff, *Photographic Science and Engineering*, 14: pp. 248–257 (1970), U.S. Pat. Nos. 4,434,226, 4,414,310, 4,433,048, 4,439,520 and British Patent No. 2,112,157.

The crystalline structure may be uniform, consisting of different compositions of halogen, or layer structure. It may also be a silver halide contacted with different compositions by epitaxial contact, or with a compound other than silver halide such as silver rhodanide and lead oxide.

Various crystalline grain mixtures also can be used.

Silver halide emulsions are usually treated by physical ripening, chemical ripening and spectral sensitization. Reagents used in these processes are described in R.D. No. 17643, 18716 and 307105, whose corresponding parts are illustrated in table hereinbelow.

The known additives for photographic are also described in the three volumes of R. D. hereinabove, and relating parts thereof are illustrated in the following table.

| Additives | R.D. No. 17643 | R.D. No. 18716 | R.D. No. 307105 |
|---|---|---|---|
| 1 chemical sensitizer | p. 23 | p. 648, right column | p. 866 |
| 2 sensitizer | | p. 648, right column | p. 866 |
| 3 spectral sensitizer, super-sensitizer | pp. 23–24 | p. 648, right column to p. 649, right column | pp. 866–868 |
| 4 bleaching agent | p. 24 | | p. 868 |
| 5 anti-fogging agent and stabilizer | pp. 24–25 | p. 649, right column | pp. 868–870 |
| 6 light absorption agent, filter dye, ultraviolet light ab- | pp. 25–26 | p. 649, right column to p. 650, left column | pp. 870–873 |

| Additives | R.D. No. 17643 | R.D. No. 18716 | R.D. No. 307105 |
|---|---|---|---|
| sorbing agent | | | |
| 7 stain preventing agent | p. 25, right column | p. 650, left to right columns | — |
| 8 dye image stabilizer | p. 25 | | |
| 9 hardener | p. 26 | p. 651, left column | pp. 874–875 |
| 10 binder | p. 26 | p. 651, left column | pp. 873–874 |
| 11 plasticizer, lubricant | p. 27 | p. 650, right column | — |
| 12 auxiliary coating agent, surface active agent | pp. 26–27 | p. 650, right column | pp. 875–876 |
| 13 static mark preventing agents | p. 27 | p. 650, right column | pp. 876–877 |

In order to prevent degradation of photographic performance by formaldehyde gas, a compound which can react with and fix formaldehyde is preferably added in photosensitive materials as is described in U.S. Pat. Nos. 4,411,987 and 4,435,503.

Various color couplers can be used in the present invention, and examples thereof are described in the referenced patents cited in R. D. No. 17643, VII-C~G hereinbefore.

Preferable examples of yellow couplers are the compounds, for example, as described in U.S. Pat. Nos. 3,933,501, 4,022,620, 4,326,024, 4,401,752, 4,248,961, Japanese Patent Examined Publication No. 10739, British Patent Nos. 1,425,020 and 1,476,760, U.S. Pat. Nos. 3,973,968, 4,314,023 and 4,511,649 and European Patent No. 249,473A.

Preferable examples of magenta couplers are 5-pyrazolone couplers or pyrazoloazole couplers as described in U.S. Pat. Nos. 4,310,619 and 4,351,897, European Patent No. 73,636, U.S. Pat. Nos. 3,061,432, 3,725,067, R. D. No. 24220 (June 1984), Japanese Patent Laid-open Publication No. 60-33552, R. D. No. 24230 (June 1984), Japanese Patent Laid-open Publication Nos. 60-43659, 61-72238, 60-35730, 55-118034, 60-185951, U.S. Pat. Nos. 4,500,630, 4,540,654, 4,556,630, PCT International Publication No. W088/04795.

Examples of cyan couplers are phenol couplers and naphthol couplers as described in U.S. Pat. Nos. 4,052,212, 4,146,396, 4,228,233, 4,296,200, 2,369,929, 2,801,171, 2,772,162, 2,895,826, 3,772,002, 3,758,308, 4,334,011 and 4,327,173, German patent publication (OLS) No. 3,329,729, European Patent Nos. 121,365A, 249,453A, U.S. Pat. Nos. 3,446,622, 4,333,999, 4,775,616, 4,451,559, 4,427,767, 4,690,889, 4,254,212, 4,296,199, and Japanese Patent Laid-open Publication No. 61-42658.

Preferable examples of colored couplers capable of correcting unwanted absorption of coloring dyes are described in R. D. No. 17643, VII-G, U.S. Pat. No. 4,163,670, Japanese Patent Examined Publication No. 57-39413, U.S. Pat. Nos. 4,004,929, 4,138,258 and 1,146,368. A coupler which can correct unwanted absorption of coloring dyes by released fluorescent dye in coupling, as described in U.S. Pat. No. 4,774,181, or a coupler having removal group of dye-precursor which can yield a color dye by reaction with developing agents, as described in U.S. Pat. No. 4,777,120 is preferable.

Preferable couplers having suitable colored dye diffusibility are described in U.S. Pat. No. 4,366,237, British Patent No. 2,125,570, European Patent No. 96,570 and German Patent Publication (OLS) No. 3,234,533.

Polymerized dye forming couplers are described in U.S. Pat. Nos. 3,451,820, 4,080,211, 4,367,282, 4,409,320, 4,576,910, and British Patent No. 2,102,173.

Couplers which release photographically useful residue with the coupling reaction are preferably used in the present invention. Preferable example of DIR coupler which release a development restrainer is described in the patents cited in R. D. NO. 17643, VII-F, i.e. Japanese Patent Laid-open Publication Nos. 57-151944, 57-154234, 60-184248, 63-37346 and 63-37350. U.S. Pat. Nos. 4,248,962 and 4,782,012.

Preferable examples of couplers which release speck former or development accelerator over the image while processing are described in British Patent Nos. 2,097,140, 2,131,188 and Japanese Patent Laid-open Publication Nos. 59157638 and 59-170840.

Further examples of couplers used in photosensitive material in the present invention are: competition coupler (U.S. Pat. No. 41,130,427), multi-equivalent coupler (U.S. Pat. Nos. 4,283,472, 4,338,393 and 4,310,618), DIR redox compound releasing coupler, DIR coupler releasing coupler, DIR coupler s releasing redox coupler or DIR redox releasing redox coupler (Japanese Patent Laid-open Publication Nos. 60-185950 and 62-24252), coupler which releases coloring dye recovering color after removal (EP No.173,302A and 313,308A), bleaching accelerator releasing coupler (R. D. No. 11449, ibid. 24241, Japanese Patent Laid-open Publication No. 61-201247), ligand releasing coupler (U.S. Pat. No. 4,553,477), leuco-dye releasing coupler (Japanese Patent Laid-open Publication No. 63-75747), and fluorescent dye releasing coupler (U.S. Pat. No. 4,774,181).

Couplers used in the present invention can be introduced into photosensitive materials by known dispersion methods.

Examples of high boiling point solvent used in the oil-in-water dispersion method are described in U.S. Pat. No. 2,322,027.

Examples of high boiling point organic solvents used in the oil-in-water dispersion method, having a melting point over 175° C. at ambient atmosphere, are: phthalate ester such as dibutylphthalate, dicyclohexylphthalate, di-2-e thylhexylphthalate, decylphthalate, bis(2,4-di-t-amylphenyl) phthalate, bis(2,4-di-t-amylphenyl)isophthalate, bis-(1-diethylpropyl)phthalate; phosphate or phosphonate ester such as triphenylphosphate, tricredylphosphate, 2-ethylhexyldiphenylphosphate, tricyclohexylphosphate, tri-2-ethylhexylphosphate, tridodecylphosphate, tribut oxyethylphosphate, trichloropropylphosphate or di-2-ethylhexylphenyl phosphonate; benzoate ester such as 2-ethylhexylbenzoate, dodecylbenzoate or 2-ethylhexyl-p-hydroxybenzoate; amides such as N,N-diethyldodecaneamide, N,N-diethyllaurylamide or N-tetradecylpyrrolidone; alcohols or phenols such as isostearylalcohol or 2,4-di-tert-amylphenol; aliphatic carboxylate esters such as bis(2-ethylhexyl)sebacate, dioctylazelate, glyceroltributylate, isostearyllactate or trioctylcitrate; aniline derivatives such as N,N-dibutyl-2-butoxy-5-tert-octylaniline; hydrocarbons such as paraffin, dodecylbenzene or diiso-propylnaphthalene.

Examples of auxiliary solvent include an organic solvent having a boiling point over approximately 30° C., preferably over approximately 50° C. and below approximately 160° C., and include ethyl acetate, butyl acetate, ethyl propionate, methyl ethyl ketone, cyclohexanone, 2-ethoxyethyl acetate or dimethyl formamide.

A process and effect of latex dispersion method, and examples of latex for impregnation are described in U.S. Pat. No. 4,199,363, German OLS Nos. 2,541,274 and 2,541,230.

It is preferable to add, in a color photosensitive material in the present invention, antibacterial or antifungal agents such as 1,2-benzisothiazoline-3-on, n-butyl-p-hydroxybenzoate, phenol, 4-chloro-3,5-dimethyl-phenol, 2-phenoxyethanol and 2-(4-thiazolyl)-benzimidazole as described in Japanese Patent Laid-open Publication Nos. 63-257747, 62-272248 and 1-80941.

A preferable support used in the present invention is described in R. D. No. 17643, page 28, No. 18716, P. 647 right column to p. 648 left column and No. 307105, page 879.

In the photosensitive materials of the present invention, a total sum of thickness of hydrophilic colloid layers on the side of emulsion layer is 28 μm or less, more preferably below 23 μm and most preferably below 20 μm. A swelling rate of film membrane $T_{\frac{1}{2}}$ is preferably below 30 seconds, more preferably below 20 seconds. A thickness of layers means the value measured at 25° C., relative humidity 55% for 2 days, and a swelling rate of film membrane $T_{\frac{1}{2}}$ can be measured by a method known in the technical field. For example a swellometer as described in A. Green et al., *Photogr. Sci. Eng.*, 19(2): pp. 124-129, can be used. $T_{\frac{1}{2}}$ is defined as time for reaching $\frac{1}{2}$ thickness of the saturated film membrane, which is 90% of maximum swelling film membrane thickness measured by treating with color developer at 30° C. for 3 min. 15 sec.

The film membrane swelling rate $T_{\frac{1}{2}}$ can be adjusted by adding hardener to binder gelatin, or controlling the time after spreading. The preferable swelling ratio is 150-400%. The swelling ratio can be calculated according to a maximum swelling film membrane thickness under the condition hereinabove, by a formula: (thickness of maximum swelling film membrane- thickness of film membrane) /thickness of film membrane.

The photographic processing of color photographic photosensitive material of the present invention can be processed by any general processing procedures, those described in R. D. No. 17643, pp. 28-29, No. 18716, P. 615 left to right columns and No. 307105, pp. 880-885.

Color developing solutions for processing the photosensitive material according to the present invention preferably are alkaline aqueous solutions containing primary aromatic amine color developing agents. Examples of these agents are aminophenol compounds or preferably pphenylenediamine compounds, and are 3-methyl-4-amino-N,N-diethylaniline, 3-methyl-4-amino-N-ethyl-N-β-hydroxyethylaniline, 3-methyl-4-amino-N-ethyl-N-β-methanesulfonamide ethylaniline, 3-methyl-4-amino-N-ethyl-βmethoxy ethylaniline, and sulfate, chloride or p-toluenesulfonate thereof. One preferable example is 3-methyl-4-amino-N-ethyl-N-β-hydroxy-ethylaniline sulfate. These compounds can be combined with each other.

The color developing solutions can further contain pH buffering agents such as carbonates, borates and phosphates of alkali metals, and developing, restrainer or anti-fogging agents such as chloride, bromide, iodide, benzimidazoles, benzothiazoles or mercapto compounds. Also the color developing solutions can contain, if necessary, preservatives such as hydroxylamine, diethylhydroxylamine, sulfite, hydrazines (N,N-biscarboxymethyl-hydrazine, etc.), phenyl semicarbazides, triethanolamine and cathechol sulfonates; organic solvent such as ethyeneglycol and diethyleneglycol; development accelerators such as benzyl alcohol, polyethylene glycol, quaternary ammonium salts and amines; dye forming couplers; competing couplers; auxiliary developing agents such as 1-phenyl-3-pyrazolidone; viscosity-imparting agents; chelating agents such as aminopolycarboxylic acid, aminopolyphosphonic acid, alkylphosphonic acid and phosphono carboxylic acid, for example ethylenediamine tetraacetate, nitrylo triacetate, diethylenetriamine pentaacetate, cyclohexanediamine tetraacetate, hydroxyethylimino diacetate, 1-hydroxyethylidene-1,1-diphosphonate, nitrilo-N,N,N-trimethylene phosphonate, ethylenediamine-N,N,N,N-tetramethylene phosphonate, ethylenediamine-di(o-hydroxyphenyl acetate) and salts thereof.

Color reversal photosensitive materials are reverse treated by general color development after monochrome developing. In the monochrome developing solutions, known monochrome developing solutions, for example dihydroxybenzenes such as hydroquinone, 3-pyrazolidones such as I-phenyl-3-pyrazolidone and aminophenols such as N-methyl-p-aminophenol can be used alone or in combination with each other.

These color developing solutions and monochrome developing solutions in general have a pH from 9 to 12. An amount of developer supplied, though depending upon treating color photographic photosensitive materials, generally is below 3 liters per 1m$^2$ of photosensitive materials, and it can be reduced below 500 ml by decreasing bromide ion concentration in the supplied solution. It is preferable to prevent evaporation and air oxidation of liquid by controlling to lessen the contact area of developing layers with air in case of decreasing supplied liquid.

The contact area of air and developing solutions in troughs can be defined by the following definition; e.g., ratio of open field.

$$\text{Ratio of open field} = \frac{\text{contact area with air and developer (cm}^3\text{)}}{\text{volume of developer (cm}^3\text{)}}$$

The above ratio preferably is below 0.1, and more preferable 0.001-0.05. In order to reduce the ratio, a barrier such as a floating plate is to be set on the surface of the developing solution. Another method to use movable cover as described in Japanese Patent Laid-open Publication No. 1-82033 or a slit development method as described in Japanese Patent Laid-open Publication No. 63-216050 can be mentioned. It is preferable to apply the reduced ratio of open field in the processes of color development and monochrome development, and further in the following processes such as bleaching, bleach-fixing, fixing, rinsing and stabilizing. An amount of supplied solution can be reduced by suppressing the accumulation of bromide ions in a developer.

Color developing time generally is set to be 2~5 min., and can be reduced by treating at higher temperature, higher pH, and higher concentration of color developing agents.

After color development, the photographic emulsion layer is usually bleached. This bleach processing may be performed simultaneously with a fix processing (bleach-fix processing), or they may be performed independently. Further, in order to stimulate treatment, bleach-fixing may be applied after bleaching. It can optionally be performed to treat with bleach fixing in 2 continuous troughs, or to bleach prior to or after bleach-fixing. Bleaching agents which can be used include compounds of polyvalent metals such as iron (III), peracids, quinons and nitroso compounds. As for preferred examples of bleaching agents, organic complex salts of iron (III), for example complex salts of aminopolycarbaoxylic acids such as ethylenediaminetetraacetic acid, diethylenetri-aminepentaacetic acid, cyclohexanediaminetetraacetic acid, methyliminodiacetic acid, 1,3-diaminopropanol-tetraacetic acid and glycolether diaminetetraacetic acid, or complex salts of organic acids such as citric acid, tartaric acid and malic acid can be used. Among these, aminopolycarboxylate-iron (III) complex salts such as ethylenediaminetetraacetate-iron (III) complex, salts and 1,3- diaminopropanoltetraacetate-iron (III) complex salts are preferable in view of rapid treatment and prevention of pollution. Aminopolycarboxylate-iron-(III) complex salt is very advantageous in bleaching solution and bleach-fixing solution. A pH of bleaching solution or bleach-fixing solution using the said aminopolycarboxylate-iron (III) complex salts is in general pH from 4.0 to 8, and it can be treated at lower pH for rapid treatment.

Bleaching accelerator optionally can be used in the bleaching solution, bleach-fixing solution or prior-solution thereof. Preferable bleaching accelerators are exemplified in the following patent specifications: compounds having mercapto or disulfide group as described in U.S. Pat. No. 3,983,858, German Patent 1,290,812, 2,059,988, Japanese patent Laid-open Publication Nos. 53-32736, 53-57831, 53-37418, 53-72623, 53-95630, 53-95631, 53-104232, 53-124424, 53-141623, 53-28426, and R. D. No. 17129 (July 1978); thiazolidine derivatives as described in Japanese Patent Laid-open Publication No. 50-140129; thiourea derivatives as described in Japanese Patent Examined Publication No. 45-8506, Japanese Patent Laid-open Publication Nos. 52-20823, 53-32735, and U.S. Pat. No. 3,706,561; iodide in German Patent 1,127,715 and Japanese Patent Laid-open Publication No. 5816235; polyoxyethylene compounds as described in German Patent Nos. 966,410 and 2,748,430; polyamine compounds as described in Japanese Patent Examined Publication No. 45-8836; and compounds as described in Japanese Patent Laid-open Publication Nos. 49-42434, 49-59644, 53-94927, 54-35727, 55-26506 and 58-163940; and bromide ion. Among these, the compounds having mercapto or disulfide group are preferable in view of acceleration effect, and the compounds as described in U.S. Pat. No. 3,893,858, German Patent 1,298,812 and Japanese Patent Laid-open Publication No. 53-95630 are preferable. Further compounds as described in U.S. Pat. No. 4,552,834 are also preferable. These bleachaccelerating agents can be added in photosensitive materials. These bleaching accelerators are especially effective in bleach-fixing treatment of color photosensitive materials for photographing.

Among others, organic acid preferably is contained in bleaching solution and bleach-fixing solution for the purpose of preventing bleach-staining. Preferable organic acids are compound having acid dissociation constant (pka) 2-5, for example acetic acid, propionic acid, and the like.

Examples of fixing agents used in fixing solution or bleach-fixing solution are thiosulfate, thiocyanate, thioether compounds, thioureas and a large amount of iodides. Thiosulfate is generally used, and ammonium thiosulfate is most widely used. It is preferable to use thiosulfate in combination with thiocyanate, thioether compounds or thiourea. Preferable preservatives for fixing solution and bleach-fixing solution are sulfite, bisulfite, carbonyl bisulfite adduct, or sulfonate as described in European Patent 294,769A. Further aminopolycarboxylates and organic phosphonates preferably can be added in fixing solution or bleach-fixing solution for the purpose of stabilizing the solution. Total desilver-processing time should be shorter within the range for avoiding incomplete desilvering. A preferable time is 1-3 min., more preferably 1-2 min. The treatment temperature should be $25°\sim50°$ C., preferably $35°\sim45°$ C. In the preferable temperature range, the desilvering rate is improved and stain-formation after treatment can effectively be prevented.

During the desilvering process, stirring should be greatly intensified. Methods of intense stirring are: a method of making a jet-stream of treatment solution collide with emulsion layer of photosensitive materials as described in Japanese Patent Laid-open Publication Nos. 62-183460 and 62-183461; a method of enlarging a stirring effect by rotary means as described in Japanese Patent Laid-open Publication No. 62-183461; a method of enlarging a stirring effect by turbulating the emulsion surface by moving the photosensitive materials simultaneously contacting with emulsion layer and the wiper blade set in a solution; and a method of increasing the whole circulating volume of the solution. These means of enlarging the stirring are effective in bleaching solution, bleach-fixing solution and fixing solution. Enlarging the stirring may result speed up in supplying bleaching solution and fixing solution in emulsion film membrane layers and as a result desilvering rate can be accelerated. Stirring enlarging means are more effective when bleaching accelerating agent are used, and accelerating effect can be improved. Inhibiting action for fixing by bleaching accelerating agent can be solved.

The film processor used for the photosensitive materials in the present invention preferably has means for transporting photosensitive materials as described in Japanese Patent Laid-open Publication Nos. 60-191257, 60-191258 and 60-191259. As described in Japanese Patent Laid-open Publication No. 60-191257, such transferring means can reduce transfer of developing solution from prebath to post bath, and hence the effect of preventing deterioration of developing solution is superior. These effects are advantageous for shortening the treatment time in the processes and reducing the amount of supplied solution.

Silver halide color photographic materials in the present invention generally are treated by rinsing and-/or stabilizing process after desilvering treatment. The amount of water in the rinsing process can be set variously according to the special characteristics of photosensitive materials, e.g., materials such as couplers, use thereof, rinsing temperature, number of rinsing tanks (number of plates), method of supplying solutions, such as counterflow or normal flow, and other conditions. Among these, a relation between the number of rinsing tanks and the amount of water in the multistep counterflow method is referred to in *J. Soc. Motion Picture and Television Eng.*, 64: pp. 248-253 (May, 1955).

According to the multistep counterflow method hereinabove, the amount of rinsing can be reduced; however there is a disadvantage that suspended materials from grown bacteria due to increasing remaining time of water in a tank are generated and adhere to the photosensitive materials. In the treatment of color photosensitive materials in the present invention, a method of reducing calcium and magnesium ions as described in Japanese Patent Laid-open Publication No. 62-288838 can be applied advantageously. Germicides, for example chlorine type germicides such as isothiazolones, thiabendazoles or sodium isocyanuric chloride as described in Japanese Patent Laid-open Publication No. 57-8542, and benzotriazole, as described in Horiguchi, H., *Chemistry of Antibacterial and Antifungal Agents*, 1986, Sankyo Publ., Hygienic Tech. Assoc., *Sterilization, Pasturization and Fungicidal Technology* (1982) and Nippon Antibacterial and Antifungal Assoc., *Dictionary of Antibacterial and Antifungal Agents* (1986).

A pH of rinsing in the treatment of photosensitive materials in the present invention is pH 4–9, preferably pH 5–8.

The temperature and rinsing time of water can be varied according to specific characteristics of photosensitive materials and use thereof, and is generally in the range of 14°–45° C. for 20 sec. to 10 min, preferably at 25°–40° C. for 30 sec. to 5 min. Further, photosensitive materials of the present invention can be treated directly with stabilizing agents in place of rinsings, for example as known from the method described in Japanese Patent Laid-open Publication Nos. 57-8543, 58-14834 and 60-220345.

Additional stabilizing treatment can be applied followed by rinsing hereinabove. One example thereof is a stabilizing treatment, used for the final treatment of photographic color photosensitive materials, containing dye-stabilizing agents and surface active agents. Examples of dye-stabilizing agents are aldehyde such as formalin or glutaraldehyde, N-methylols, hexamethylenetetramine or aldehyde sulfite adduct.

Cheleting agents and antifungal agents can be added to the stabilizing solution.

Overflowed liquids in rinsings and/or supplied stabilizing solution can be recycled in other processes such as the desilvering process.

Concentration of solutions in any processes in the film processor can preferably be compensated by adding water.

The silver halide color photographic sensitive materials in the present invention may contain color developing agents for the purpose of simplifying and speeding-up the treatment. Each precursor for color developing agents can be used. For example, indoaniline as described in U.S. Pat. No. 3,342,597, Schiff alkali type compounds as described in U.S. Pat. No. 3,342,599, R. D. No. 14850 and 15159, aldol compound as described in R. D. No. 13924, metal salt complex as described in U.S. Pat. No. 3,719,492 and urethanes as described in Japanese Patent Laid-open Publication No. 53-135628, can be mentioned.

Silver halide color photosensitive materials in the present invention may contain 1-phenyl-3-pyrazolidones in order to stimulate color developing as required. Typical examples are described in Japanese Patent Laid-open Publication Nos. 56-64339, 57-144547 and 58-115438.

Each treatment solution in the present invention can be used at 10°–50° C. In general, a temperature at 33°–38° C. is standard, but the treating time can be shortened by accelerating the treatment at higher temperature or improvement in quality of picture and stabilization of liquid at lowering temperature also can be performed. Further, in order to reduce silver in the photosensitive materials, cobalt or hydrogen peroxide is added for processing as described in German Patent No. 2,226,770 and U.S. Pat. No 3,674,499.

The silver halide photosensitive materials in the present invention can be applied to heat-developing photosensitive materials as described in U.S. Pat. No. 4,500,626, Japanese Patent Laid-open Publication Nos. 60-133449, 59-218443, 61-238056 and European Patent 210660A2.

The present invention will now be explained in more detail with reference to the following Examples 1 and 2 to which this invention is not limited.

Embodiment 1 a) Preparation of a coating solution containing slipping agent for protective layer An aqueous suspension of slipping agent was prepared in the following manner.

| Solution A: | slipping agent | 2 g |
|---|---|---|
|  | ethyl acetate | 1 g |
| Solution B: | gelatin 5% aqueous solution | 20 ml |
|  | sodium triisopropyl-naphthalene sulfonate | 2 g |
| Solution C: | gelatin 7% aqueous solution | 50 ml |

A mixture of solutions A and B was homogenized with pressure of 250 kg/m$^2$ using the valve type homogenizer (MANTONGAULIN MANUF. CO. INC.) to obtain O/W type suspension. Average grain size of the dispersed material in the gelatin aqueous solution was controlled in 0.8 μm. Solution C was added to the suspension and further water was added up to 80 ml to prepare a slipping aqueous suspension D.

An aqueous suspension of a mat agent E was prepared as illustrated in the following.

A 5% solution (25 ml) of poly(methyl methacrylate) in ethyl acetate was gradually added to a mixture of 10% aqueous solution of gelatin (100 ml) and 5% aqueous solution of sodium dodecylbenzenesulfonate (10 ml) with vigorous stirring at 45° C., and further vigorously stirred to suspend for 10 min. by using homogenizer. After complete homogenizing, ethyl acetate was removed off with heating. Average grain size of mat agent was 3.5 μm.

A coating solution F for the surface protective layer was prepared by mixing an aqueous suspension of slipping agent D with a suspension of mat agent E as shown in the following.

| 5% aq. solution of gelatin | 1000 ml |
|---|---|
| Aq. suspension of slipping agent D | 70 ml |
| 5% aq. solution of sodium dodecylbenzenesulfonate | 20 ml |
| Sodium p-styrenesulfonate | 0.5 g |
| Aq. suspension of mat agent E | 60 ml |

Each of these solutions was added and mixed while being stirred to obtain the coating solution F.

b) Preparation of coating solution for back layer:

A coating solution G was prepared by dissolving the following compositions in the illustrated order.

| | | |
|---|---|---|
| Acetone | 700 | ml |
| Methanol | 200 | ml |
| Methylenechloride | 100 | ml |
| Cellulose diacetate | 4 | g |
| Slipping agent | 2 | g |

Further, in the solution G, the slipping agent was replaced by fine grain silicon oxide (0.5 g), average grain size 0.2 μm, to prepare a coating solution H.

c) Coating the back layer:

As shown in the Table 2, the above coating solution for the back layer was coated on the cellulose triacetate photographic film support and dried at 90° C. for 30 minutes to set a back layer. For the control group a solution deleting the slipping agent from the solution F was prepared as "none of slipping agent" indicated in Table 2.

The amount of coating was set up to the slipping agent as 200 mg/m$^2$.

These samples were kept at 25° C. in humidity at 65% RH for 7 days after coating.

d) Preparation of color photosensitive materials:

On a cellulose triacetate film support, as shown in Table 2 hereinbelow, having been provided with the back layer and undercoated, there was prepared a multilayer color photographic material consisting of the following layers.

Composition of Photosensitive Layer

The amount of silver coated in silver halide is expressed as g/m$^2$, that of coupler, additives and gelatin is expressed as g/m$^2$, and that of sensitizing dye is expressed as mole per mole of silver halide in the same layer.

| | |
|---|---|
| 1st layer: Anti-Halation layer | |
| Black colloidal silver | 0.18 |
| Gelatin | 1.40 |
| 2nd layer: Interlayer | |
| 2,5-di-t-pentadecyl hydroquinone | 0.18 |
| EX-1 | 0.07 |
| EX-3 | 0.02 |
| EX-12 | 0.002 |
| U-1 | 0.06 |
| U-2 | 0.08 |
| U-3 | 0.10 |
| HBS-1 | 0.10 |
| HBS-2 | 0.02 |
| Gelatin | 1.04 |
| 3rd layer: 1st Red-Sensitive Emulsion Layer | |
| Emulsion A silver | 0.25 |
| Emulsion B silver | 0.25 |
| Sensitization pigment I | $6.9 \times 10^{-5}$ |
| Sensitization pigment II | $1.8 \times 10^{-5}$ |
| Sensitization pigment III | $3.1 \times 10^{-4}$ |
| EX-2 | 0.335 |
| EX-10 | 0.020 |
| U-1 | 0.07 |
| U-2 | 0.05 |
| U-3 | 0.07 |
| HBS-1 | 0.060 |
| Gelatin | 0.87 |
| 4th layer: 2nd Red-Sensitive Emulsion Layer | |
| Emulsion G silver | 1.0 |
| Sensitization pigment I | $5.1 \times 10^{-5}$ |
| Sensitization pigment II | $1.4 \times 10^{-5}$ |
| Sensitization pigment III | $2.3 \times 10^{-4}$ |
| EX-2 | 0.400 |
| EX-3 | 0.050 |
| EX-10 | 0.015 |
| U-1 | 0.07 |
| U-2 | 0.05 |
| U-3 | 0.07 |
| Gelatin | 1.30 |
| 5th layer: 3rd Red-Sensitive Emulsion Layer | |
| Emulsion D silver | 1.60 |
| Sensitization pigment I | $5.4 \times 10^{-5}$ |
| Sensitization pigment II | $1.4 \times 10^{-5}$ |
| Sensitization pigment III | $2.4 \times 10^{-4}$ |
| EX-3 | 0.010 |
| EX-4 | 0.080 |
| EX-2 | 0.097 |
| HBS-1 | 0.22 |
| HBS-2 | 0.10 |
| Gelatin | 1.63 |
| 6th layer: Interlayer | |
| EX-5 | 0.040 |
| HBS-1 | 0.020 |
| Gelatin | 0.80 |
| 7th layer: 1st Green-Sensitive Emulsion Layer | |
| Emulsion A silver | 0.15 |
| Emulsion B silver | 0.15 |
| Sensitization pigment V | $3.0 \times 10^{-5}$ |
| Sensitization pigment VI | $1.0 \times 10^{-4}$ |
| Sensitization pigment VII | $3.8 \times 10^{-4}$ |
| EX-6 | 0.260 |
| EX-1 | 0.021 |
| EX-7 | 0.030 |
| EX-8 | 0.025 |
| HBS-1 | 0.100 |
| HBS-3 | 0.010 |
| Gelatin | 0.63 |
| 8th layer: 2nd Green-Sensitive Emulsion Layer | |
| Emulsion C silver | 0.45 |
| Sensitization pigment V | $2.1 \times 10^{-5}$ |
| Sensitization pigment VI | $7.0 \times 10^{-5}$ |
| Sensitization pigment VII | $2.6 \times 10^{-4}$ |
| EX-6 | 0.094 |
| EX-8 | 0.018 |
| EX-7 | 0.026 |
| HBS-1 | 0.160 |
| HBS-3 | 0.008 |
| Gelatin | 0.50 |
| 9th layer: 3rd Green-Sensitive Emulsion Layer | |
| Emulsion E silver | 1.2 |
| Sensitization pigment V | $3.5 \times 10^{-5}$ |
| Sensitization pigment VI | $8.0 \times 10^{-5}$ |
| Sensitization pigment VII | $3.0 \times 10^{-4}$ |
| EX-13 | 0.015 |
| EX-11 | 0.100 |
| EX-1 | 0.025 |
| HBS-1 | 0.25 |
| HBS-2 | 0.10 |
| Gelatin | 1.54 |
| 10th layer: Yellow Filter Layer | |
| Yellow colloidal silver | 0.05 |
| EX-5 | 0.08 |
| HBS-1 | 0.03 |
| Gelatin | 0.95 |
| 11th layer: 1st Blue-Sensitive Emulsion Layer | |
| Emulsion A silver | 0.08 |
| Emulsion B silver | 0.07 |
| Emulsion F silver | 0.07 |
| Sensitization pigment VIII | $3.5 \times 10^{-4}$ |
| EX-9 | 0.721 |
| EX-8 | 0.042 |
| HBS-1 | 0.28 |
| Gelatin | 1.10 |
| 12th layer: 2nd Blue-Sensitive Emulsion Layer | |
| Emulsion G silver | 0.45 |
| Sensitization pigment VIII | $2.1 \times 10^{-4}$ |
| EX-9 | 0.154 |
| EX-10 | 0.007 |
| HBS-1 | 0.05 |
| Gelatin | 0.78 |
| 13th layer: 3rd Blue-Sensitive Emulsion Layer | |
| Emulsion H silver | 0.77 |
| Sensitization pigment VIII | $2.2 \times 10^{-4}$ |
| EX-9 | 0.20 |
| HBS-1 | 0.07 |

| | | |
|---|---|---|
| Gelatin | 0.69 | |
| 14th layer: 1st Protective Layer | | |
| Emulsion I silver | 0.20 | |
| U-4 | 0.11 | |
| U-5 | 0.17 | |
| HBS-1 | 0.05 | |
| Gelatin | 1.00 | |
| 15th layer: 2nd Protective Layer | | |
| Compound of the present invention See Table 2 | | |
| Polymethylacrylate grain | 0.014 | |
| (diameter approx. 3.5 μm) | | |
| S-1 | 0.20 | |
| Gelatin | 1.20 | |

Each layer hereinabove contains gelatin hardener H-1 and surface active agent in addition to the above components.

Emulsions A-I are shown in Table 1. Illustration of each component follows Table 1.

TABLE 1

| | Average ratio of AgI content | Average grain diameter | Coefficient of diameter variation | Ratio of diameter/ thickness | Ratio of amount of silver (AgI content %) |
|---|---|---|---|---|---|
| Emulsion A | 4.0% | 0.45 μm | 27% | 1 | core/shell = ⅓ (13/1), Double structure grain |
| Emulsion B | 8.9% | 0.70 μm | 14% | 1 | core/shell = 3/7 (25/2), Double structure grain |
| Emulsion C | 10% | 0.75 μm | 30% | 2 | core/shell = ½ (24,3) Double structure grain |
| Emulsion D | 16% | 1.05 μm | 35% | 2 | core/shell = 4/6 (40/0), Double structure grain |
| Emulsion E | 10% | 1.05 μm | 35% | 3 | core/shell = ½ (24/3), Double structure grain |
| Emulsion F | 4.0% | 0.25 μm | 28% | 1 | core/shell = ⅓ (13/1), Double structure grain |
| Emulsion G | 14.0% | 0.75 μm | 25% | 2 | core/shell = ½ (42/0), Double structure grain |
| Emulsion H | 14.5% | 1.30 μm | 25% | 3 | core/shell = 37/63 (34/1), Double structure grain |
| Emulsion I | 1% | 0.07 μm | 15% | 1 | Homogeneous grain |

EX-1

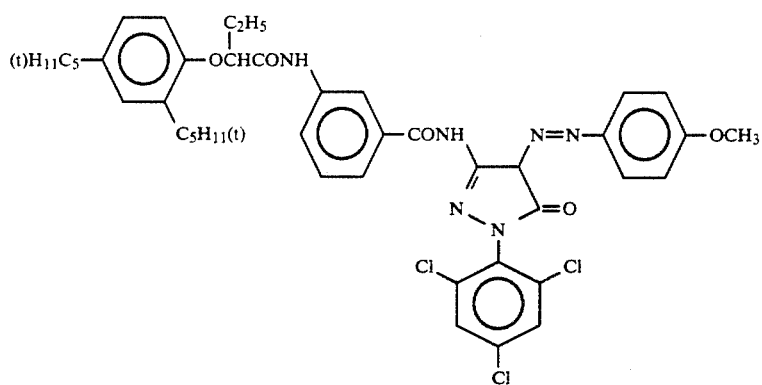

EX-2

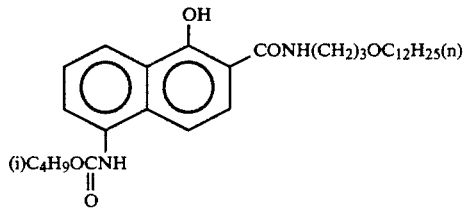

EX-3

-continued
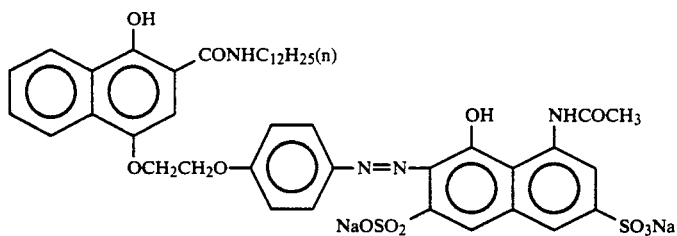
EX-4
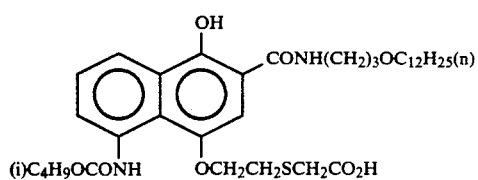
EX-5
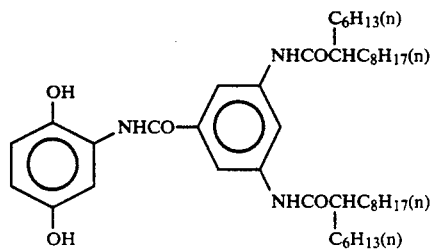
EX-6
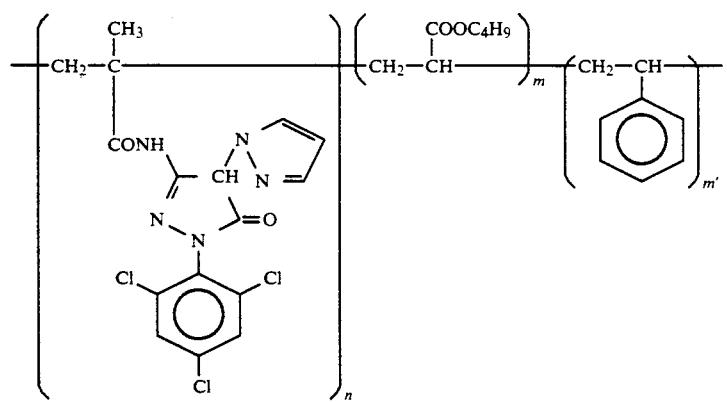
n = 50
m = 25
m' = 25
mol. wt. approximately 20,000
EX-7
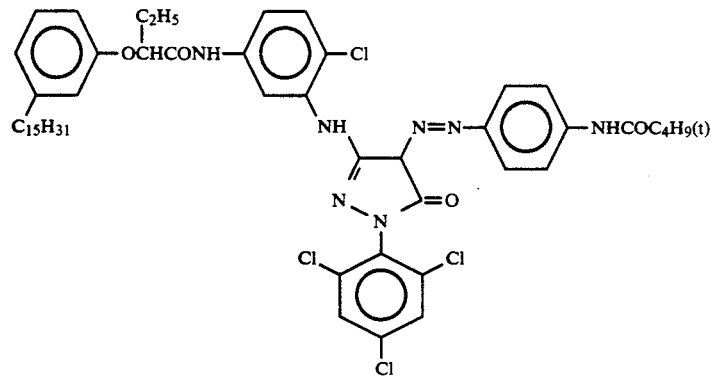
EX-8

-continued
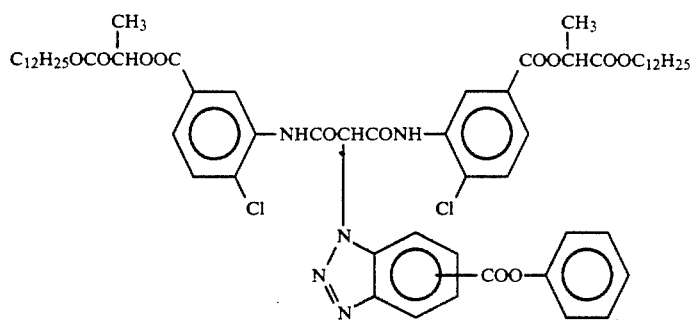
EX-9
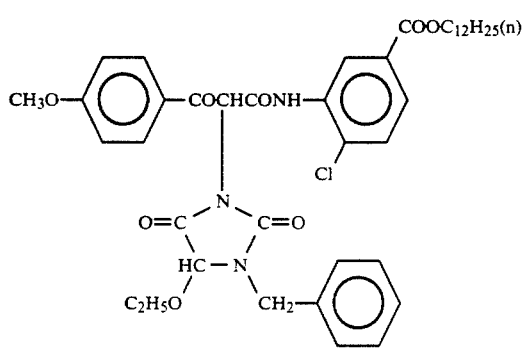
EX-10
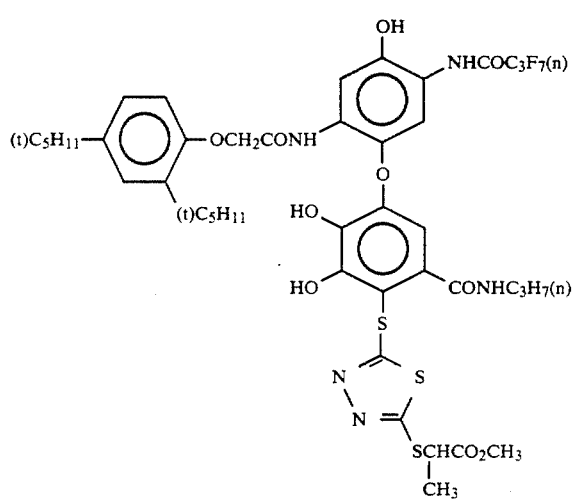
EX-11
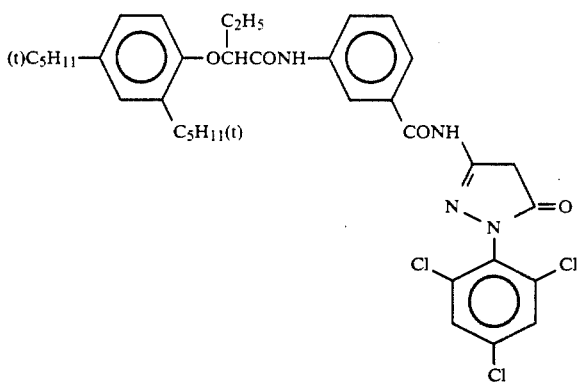
EX-12
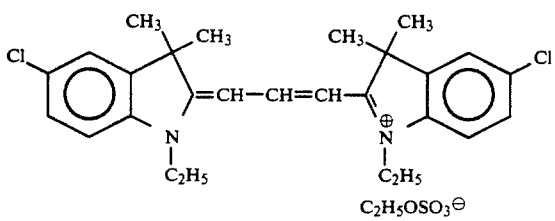
EX-13

-continued
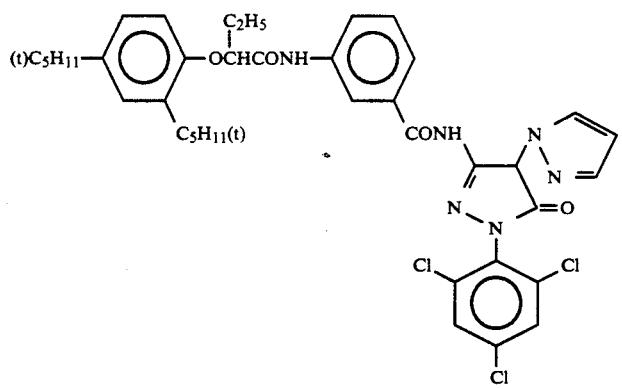
U-1
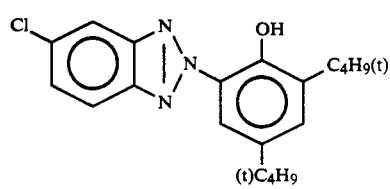
U-2
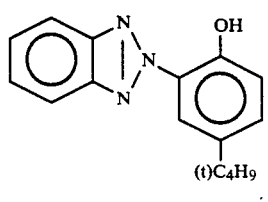
U-3
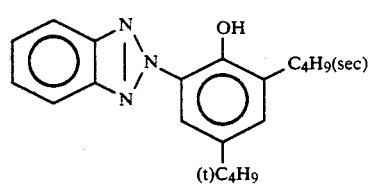
U-4
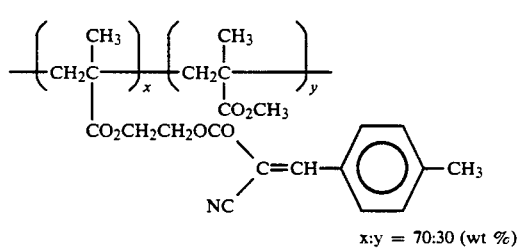
x:y = 70:30 (wt %)
U-5
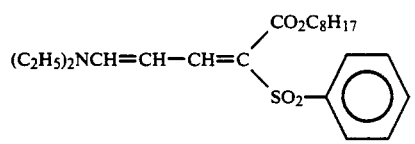
HBS-1
tricresyl phosphate
HBS-2
di-n-butylphthalate
HBS-3
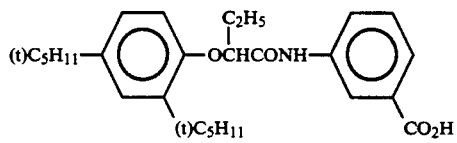
Sensitizing dye I
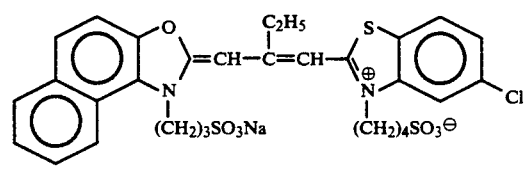
Sensitizing dye II
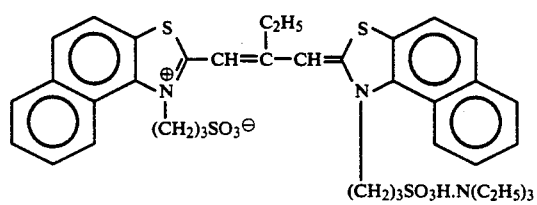
Sensitizing dye III -continued
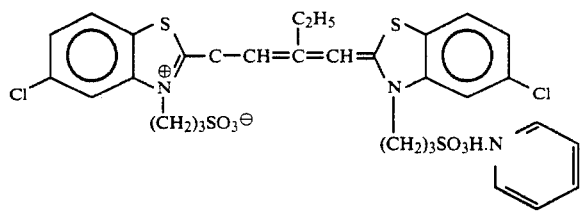
Sensitizing dye V
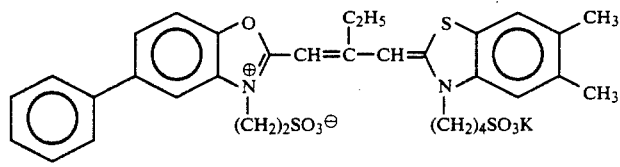
Sensitizing dye VI
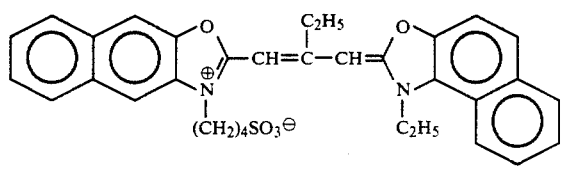
Sensitizing dye VII
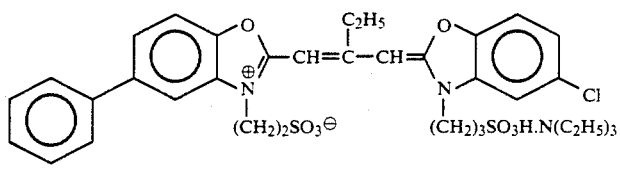
Sensitizing dye VIII
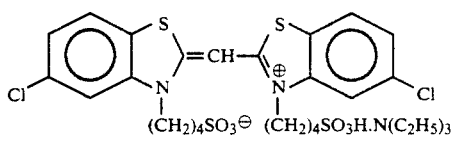
S-1
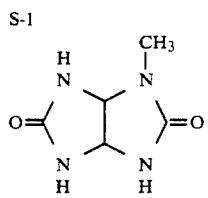
H-1
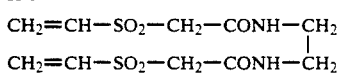
Slipping agent I-1
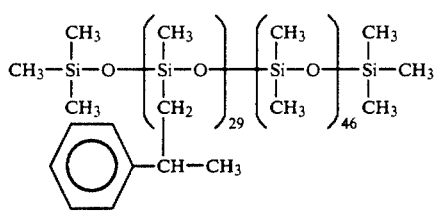
I-4
polydimethylsiloxane
II-1
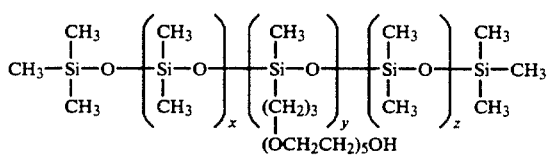
III-1
erucic acid amide
IV-4
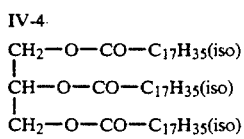
IV-5
V-1

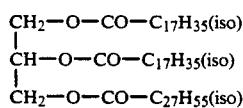

VI-1

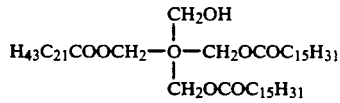

e) Production of a film unit having an exposure mechanism

The above-described photosensitive material or film was cut at a length of 115 cm and a width of the 135-size, and contained in a roll in the film supply chamber 19 of the film unit 2 as illustrated in FIG. 1. The trailing end 15B was attached on the spool 16 which was contained in the film take-up chamber 20. The main body 12 was light-tightly attached to the front cover 13 and the rear cover 14 so as to form an example of the film unit 2, in which the radius of curvature of the guide surface 32B of the guide member 32 was 15 mm, the diameter of the spool 16 was approximately 11 mm, and the maximum diameter of the film 15 wound in a roll was approximately 22 mm. The width of the light-trapping fabric 35 was 5 mm deep.

f) Measurement of the coefficient of dynamic friction between the emulsion surface and the back surface The coefficient of dynamic friction between both surfaces of the experimental film was measured as follows: The exemplary film was attached to a metal piece of stainless steel with the surface protective layer arranged outward, and constituted a pressurizing fixed element with application of a load of 100 g. Another strip of the exemplary film was fixed on a horizontally slidable experimental stand with the opposite surface arranged upward. The pressurizing fixed element with a load cell attached was placed on the experimental stand. The resistant force in the horizontal direction was measured when the experimental stand was moved at a speed of 1 m/min. horizontally at a distance of 10 μm. The friction coefficient was obtained by dividing the load 100 g into the resistant force.

g) Measurement of the coefficient of dynamic friction of each surface of the film The measurement of the coefficient of dynamic friction of the respective surface followed such a conventional method as: A steel ball of the diameter of 5 mm with load of 100 g applied thereto was placed on the surface to be measured. The resistant force in the horizontal direction was measured when the surface to be measured on the experimental slidable stand was moved at a speed of 1 m/min. horizontally at a distance of 10 μm. The friction coefficient was obtained by dividing the load 100 g into the resistant force.

h) Measurement of scratch resistance

The scratch resistance of the exemplary film was evaluated by measuring the minimum load (measured in grams) at which a scratch was seen with light transmitted through the film by use of a Heide-18 measuring device (manufactured by Shinto Scientific Co., Ltd.), while a scratch was made on the film at a load continuously variable from 0 g to 100 g with a stylus or needle of diamond of a radius of 0.025 mm.

i) Test on capability for letting out the leading end portion in reverse rotation For each of the exemplary film, a further 2 or 3 rotations of the spool 16 were made to wind the film after effecting all the exposures. The arresting member 40 was released from engaging with the film advancing knob 9 to free the spool 16. The ridge 16A of the spool 16 was reverse rotated with a screwdriver to test the degree of facility in letting out the film, of which the results of the experiments are shown in Table 2. The exemplary photosensitive materials produced in various types were preserved for 7 days, and subjected to measurement of the coefficient of friction of the back surface against a steel ball, the coefficient of friction between the back surface and the protective layer, and the scratch resistance of the back surface, of which the results shown in the same table.

These results show the fact that, when the photosensitive materials are 0.35 or less in the coefficient of friction between the back surface and the emulsion surface, and 0.36 or less in the coefficient of friction of the back surface against a steel ball, then they are advantageous in comparatively smoothly letting out the film with reverse rotation and high scratch resistance.

TABLE 2

| Sample number of film | Slipping agent of back layer | Slipping agent of protective layer | Friction coefficient of back layer against steel ball | Friction coefficient between back and protective layers | Scratch resistance of back layer | Facility in letting film out |
|---|---|---|---|---|---|---|
| 1 | none | none | 0.65 | 0.68 | 20 g | D |
| 2 | none | I-1 | 0.65 | 0.45 | 20 g | C |
| 3 | none | II-1 | 0.65 | 0.37 | 20 g | C |
| 4 | none | III-1 | 0.65 | 0.40 | 20 g | C |
| 5 | none | IV-4 | 0.65 | 0.36 | 20 g | C |
| 6 | none | V-I | 0.65 | 0.40 | 20 g | C |
| 7 | none | VI-1 | 0.65 | 0.37 | 20 g | C |
| 8 | liquid H | I-1 | 0.50 | 0.35 | 37 g | C |
| 9 | I-4 | I-1 | 0.28 | 0.28 | 59 g | A |
| 10 | I-4 | III-1 | 0.28 | 0.27 | 59 g | A |
| 11 | I-4 | IV-4 | 0.28 | 0.29 | 59 g | A |

TABLE 2-continued

| Sample number of film | Slipping agent of back layer | Slipping agent of protective layer | Friction coefficient of back layer against steel ball | Friction coefficient between back and protective layers | Scratch resistance of back layer | Facility in letting film out |
|---|---|---|---|---|---|---|
| 12 | II-1 | I-1 | 0.36 | 0.27 | 48 g | B |
| 13 | II-1 | I-4 | 0.36 | 0.26 | 48 g | B |
| 14 | II-1 | II-1 | 0.36 | 0.22 | 48 g | B |
| 15 | IV-4 | I-1 | 0.28 | 0.27 | 60 g | A |
| 16 | IV-4 | I-4 | 0.28 | 0.28 | 60 g | A |
| 17 | IV-4 | III-1 | 0.28 | 0.30 | 60 g | A |
| 18 | IV-5 | V-1 | 0.28 | 0.30 | 57 g | A |
| 19 | V-1 | IV-5 | 0.31 | 0.29 | 54 g | B |
| 20 | V-1 | I-1 | 0.31 | 0.28 | 54 g | A |
| 21 | V-1 | II-1 | 0.31 | 0.26 | 54 g | A |
| 22 | V-1 | III-1 | 0.31 | 0.27 | 54 g | A |
| 23 | V-1 | V-1 | 0.31 | 0.27 | 54 g | A |
| 24 | V-1 | VI-1 | 0.31 | 0.28 | 54 g | B |
| 25 | VI-1 | V-1 | 0.28 | 0.33 | 55 g | A |
| 26 | VI-1 | VI-1 | 0.28 | 0.28 | 55 g | A |

A: smooth letting-out possible;
B: letting-out possible;
C: letting-out barely possible;
D: letting-out impossible.

Embodiment 2

By use of a lens-fitted film unit containing samples of Nos. 1, 5, 8, 9, 12, 15, 18, 25 and 26 obtained from Embodiment 1, a photograph was taken with the object consisting of a person, a Macbeth color chart, flowers and grass at 3.6 m of the object distance, for which the condition was an outdoor cloudy view field. Another photograph was taken with the object consisting of a person and a Macbeth color chart at 2 m of the object distance, indoors under a light source of a daylight color about 4800° K. Still another photograph was taken with the object of a landscape. All exposures effected, the film was completely wound up.

An improvement was made on a mini-lab system "Champion 23S" (merchandise name; manufactured by FUJI PHOTO FILM CO., LTD.), which was additionally provided with the housing holders 126, the spool rotating mechanism 131, the cutter 139, the splice unit 130, the sheet holder 120, the controller and the like to form the film processor as illustrated in FIG. 15. The above samples were subjected in the processor to an automatic withdrawal and developed in the developing processes to be described below.

Color Processing Procedure

Solution was used in a condition at the time when the cumulative amount of supply was 3 times as large as the volume of the tank of the solution.

| Process | Processing time | Temp. | Amount of supply*[1] | Tank volume |
|---|---|---|---|---|
| Color development | 3 min. 15 sec. | 38° C. | 45 ml | 10 l |
| Bleaching | 1 min. 0 sec. | 38° C. | 20 ml | 4 l |
| Bleaching/Fixing | 3 min. 15 sec. | 38° C. | 30 ml | 8 l |
| Rinsing (1) | 40 sec. | 35° C. | *2 | 4 l |
| Rinsing (2) | 1 min. 0 sec. | 35° C. | 30 ml | 4 l |
| Stabilizing | 40 sec. | 38° C. | 20 ml | 4 l |
| Drying | 1 min. 15 | 55° C. | | |

| Process | Processing time | Temp. | Amount of supply*[1] | Tank volume |
|---|---|---|---|---| sec.

*[1]: Amount supplied per 1 mm length with width 35 mm.
*[2]: Counterflow piping from rinsing trough (2) to rinsing trough (1).

Compositions of treatment solution are shown herein below.

| Color developer | Solution in Tank | in Filler |
|---|---|---|
| diethylenetriamine pentaacetic acid | 1.0 g | 1.1 g |
| 1-hydroxyethylidene-1,1-diphosphonic acid | 3.0 g | 3.2 g |
| sodium sulfite | 4.0 g | 4.4 g |
| potassium carbonate | 30.0 g | 37.0 g |
| potassium bromide | 1.4 g | 0.7 g |
| potassium iodide | 1.5 mg | — |
| hydroxylamine sulfate | 2.4 g | 2.8 g |
| 4-(N-ethyl-N-$\beta$-hydroxyethlamine)-2-methylaniline sulfate | 4.5 g | 5.5 g |
| add water to | 1.0 l | 1.0 l |
| pH | 10.05 | 10.10 |

Bleaching Solution
Both in the Tank and the Filler

| | |
|---|---|
| ferric ammonium ethylenediamine tetraacetate dihydrate | 120.0 g |
| disodium ethylenediamine tetraacetate | 10.0 g |
| ammonium bromide | 100.0 g |
| ammonium nitrate | 10.0 g |
| bleaching accelerator | 0.005 mole |

$$\left(\left(\begin{array}{c}H_3C\\ \diagdown\\ \diagup\\ H_3\end{array}N-CH_2-CH_2-S\right)_2\right).2HCl.$$

| | |
|---|---|
| aq. ammonia (27%) | 15.0 ml |
| add water to | 1.0 l |
| pH | 6.3 |

Bleaching Fixer

Both in the Tank and the Filler

| | |
|---|---|
| ferric ammonium ethylenediamine tetraacetate dehydrate | 50.0 g |
| ferric disodium ethylenediamine tetraacetate | 5.0 g |
| sodium sulfite | 12.0 g |
| ammonium thiosulfate aqueous solution (70%) | 240.0 ml |
| aq. ammonia (27%) | 15.0 ml |
| add water to | 1.0 l |
| pH | 7.2 |

Rinsing Solution

Both in the Tank and the Filler

Tap water was passed through a column of mixed bed type packed with strong acid cation exchange resin, H-type (Rhom and Haas Co., Amberlite IR-120B) and anion exchange resin, OH-type (Amberlite IR-400) to treat calcium and magnesium ion concentrations below 3 mg/l, then sodium isocyanuric acid dihydrochloride 20 mg/l and sodium sulfate 0.15 g/l were added therein. pH of the solution was within a range of PH 6.5-7.5.

Stabilizer

Both in the Tank and the Filler

| | |
|---|---|
| formalin (37%) | 2.0 ml |
| polyoxyethylene-p-monononylphenyl ether (average degree of polymerization 10) | 0.3 g |
| disodium ethylenediamine tetraacetate | 0.05 g |
| add water to | 1.0 l |
| pH | 5.0–8.0 |

With the sample Nos. 9, 12, 15, 18, 25 and 26, it was possible to smoothly let out the film to subject it to processing procedure. The sample No. 1 was unable to be let out of the film unit housing. It was possible to let out the film of the sample Nos. 5 and 8, though the load against the reverse rotation of the spool was enlarged.

Although the present invention has been fully described by way of the preferred embodiments thereof with reference to the accompanying drawings, various changes and modifications will be apparent to those having skill in this field. Therefore, unless otherwise the changes and modifications depart from the scope of the present invention, they should be construed as included therein.

What is claimed is:

1. A photographic processing system comprising a photographic film unit and a processor for subjecting said film unit to processing;
    said photographic film unit being preloaded with an unexposed photographic film, and including:
    a) an exposure station for exposing said unexposed film;
    b) a film supplying chamber disposed beside said exposure station for containing said unexposed film wound in a roll with a film leader wound internally;
    c) a film take-up chamber disposed on a side opposite to said films supplying chamber with respect to said exposure station, in which a spool is contained rotatably, on which spool said film subjected to exposure is wound after passage through an entrance of said film take-up chamber when said spool is rotated in a first direction;
    d) a shutter and a taking lens disposed in front of said exposure station;
    e) a film wind-up mechanism for rotating said spool so as to feed said film frame by frame;
    f) a film outlet formed on said film take-up chamber for passing said film leader toward an outside of said film unit when said spool is rotated in a second direction opposite to said first direction after winding said film leader in said film take-up chamber; and
    g) a light shielding member provided with said film outlet for shielding an inside of said film take-up chamber from light; and
    said processor including:
    A) film unit holding means for being loaded with said film unit;
    B) a processor unit for processing said exposed film;
    C) control means for controlling said processor unit;
    D) spool rotating means for rotating said spool in said film unit loaded in said film unit holding means in said second direction in accordance with an output from said control means; and
    E) film transporting means for transporting said film leader to said processor unit in accordance with an output from said control means, said film leader being let out of said film outlet.

2. A photographic processing system as defined in claim 1, wherein said photographic film unit further includes a rewind preventing means for preventing said spool from rotating in said second direction, and
    wherein said processor further includes means for incapacitating said rewind preventing means.

3. A photographic processing system as defined in claim 2, wherein said spool rotating means of said processor includes:
    a first motor whose rotation is controlled by said control means;
    a shaft mounted on said first motor for transmitting rotation of said first motor to said spool; and
    means for shifting said shaft in an axial direction to connect said shaft with said spool in accordance with an output of said control means.

4. A photographic processing system as defined in claim 3, wherein said film transporting means of said processor includes:
    a roller pair for transporting said film let out of said film outlet toward said processor unit; and
    a second motor for rotating said roller pair, rotation of said second motor being controlled by said control means.

5. A photographic processing system as defined in claim 4, wherein said film unit holding means is loaded with one film unit at one time.

6. A photographic processing system as defined in claim 4, wherein said film unit holding means is loaded with a plurality of film units vertically lapped one over another in a state horizontally laying on a rear surface of said film units and said spool.

7. A photographic processing system as defined in claim 4, wherein said film processor further includes a film splice device for splicing a film trailer of said film let out of said film unit to a film leader of a following film.

8. A photographic processing system as defined in claim 4, wherein said processor further includes a film splice device for splicing said film leader of said film let out of said film unit to a leader sheet.

9. A photographic processing system as defined in claim 8, wherein said leader sheet is spliced respectively with two strips of film in a parallel arrangement.

10. A photographic processing system as defined in claim 4, wherein said spool rotating means rotates a wind-up dial of said wind-up mechanism in contact therewith.

11. A photographic processing system as defined in claim 6, wherein said processor further includes:
  receiving means formed in a downward vicinity of said film unit holding means for placing said film unit after letting out said film from said film unit;
  a film unit transporting member slidably mounted in the vicinity of a bottom of said film unit holding means for moving a lowest of said plurality- of film units toward said receiving means; and
  sliding means for sliding said transporting member in accordance with an output from said control means.

12. A processor for subjecting a lens-fitted photographic film unit in which rotation of a spool in a film take-up chamber in a second direction opposite to a first direction for winding an exposed photographic film lets out said exposed film to an outside through a film outlet formed on said film take-up chamber, said processor comprising:
  film unit holding means for being loaded with said film unit;
  spool rotating means for rotating said spool in said film unit loaded in said film unit holding means in said second direction; and
  a processor unit for processing said exposed film let out of said film outlet.

* * * * *